United States Patent [19]
Takeshima et al.

[11] Patent Number: 5,331,809
[45] Date of Patent: Jul. 26, 1994

[54] EXHAUST GAS PURIFICATION SYSTEM FOR AN INTERNAL COMBUSTION ENGINE

[75] Inventors: Sinichi Takeshima, Susono; Kenji Katoh, Shizuoka; Sinya Hirota, Susono, all of Japan

[73] Assignee: Toyota Jidosha Kabushiki Kaisha, Toyota, Japan

[21] Appl. No.: 625,893

[22] Filed: Dec. 4, 1990

[30] Foreign Application Priority Data

| Dec. 6, 1989 | [JP] | Japan | 1-315175 |
| Dec. 15, 1989 | [JP] | Japan | 1-144133 |
| May 24, 1990 | [JP] | Japan | 2-132530 |
| Jun. 25, 1990 | [JP] | Japan | 2-164092 |
| Jun. 26, 1990 | [JP] | Japan | 2-165775 |

[51] Int. Cl.$^5$ .................................................. F01N 3/28
[52] U.S. Cl. .................................... 60/288; 60/289; 60/298
[58] Field of Search ............... 60/286, 288, 298, 289, 60/290

[56] References Cited

U.S. PATENT DOCUMENTS

| 3,181,928 | 5/1965 | Frilette | 60/299 |
| 3,282,046 | 11/1966 | Walker | 60/288 |
| 4,315,895 | 2/1982 | Bramer | 422/171 |
| 4,331,644 | 5/1983 | Ritscher | 423/437 |
| 4,394,351 | 7/1983 | Gast | 422/171 |
| 4,404,795 | 9/1983 | Oishi et al. | 60/274 |
| 4,438,627 | 3/1984 | Gotoh | 60/298 |
| 4,583,363 | 4/1986 | Urushidani et al. | 60/276 |
| 5,125,231 | 6/1992 | Patil | 60/288 |

FOREIGN PATENT DOCUMENTS

| 1205980 | 6/1986 | Canada | 60/297 |
| 2815456 | 10/1978 | Fed. Rep. of Germany . | |
| 1413228 | 8/1965 | France . | |
| 2173013 | 1/1974 | France . | |
| 57-41440 | 3/1982 | Japan . | |
| 57-210116 | 12/1982 | Japan . | |
| 60-18502 | 1/1985 | Japan . | |
| 61-112715 | 5/1986 | Japan . | |
| 1-139144 | 5/1989 | Japan . | |
| 1-247710 | 10/1989 | Japan . | |
| 2-233145 | 9/1990 | Japan . | |

*Primary Examiner*—Douglas Hart
*Attorney, Agent, or Firm*—Kenyon & Kenyon

[57] ABSTRACT

An exhaust gas purification system for an internal combustion engine includes a catalyst installed in an exhaust conduit of an engine and constructed of zeolite carrying at least one kind of metal selected from transition metals and noble metals to reduce nitrogen oxides included in the exhaust gas from the engine under an oxidizing gas condition and in the presence of hydrocarbons. The system further includes means for repeating a cycle of cooling the catalyst and then stopping the cooling to allow the catalyst to rise in temperature so that the temperature rising courses of the catalyst are positively and repeatedly produced. Since the catalyst can show a higher nitrogen oxides reducing ability in the temperature rising course than in the temperature lowering course, the NOx purification rate is greatly improved due to the positive production of the temperature rising courses.

22 Claims, 24 Drawing Sheets

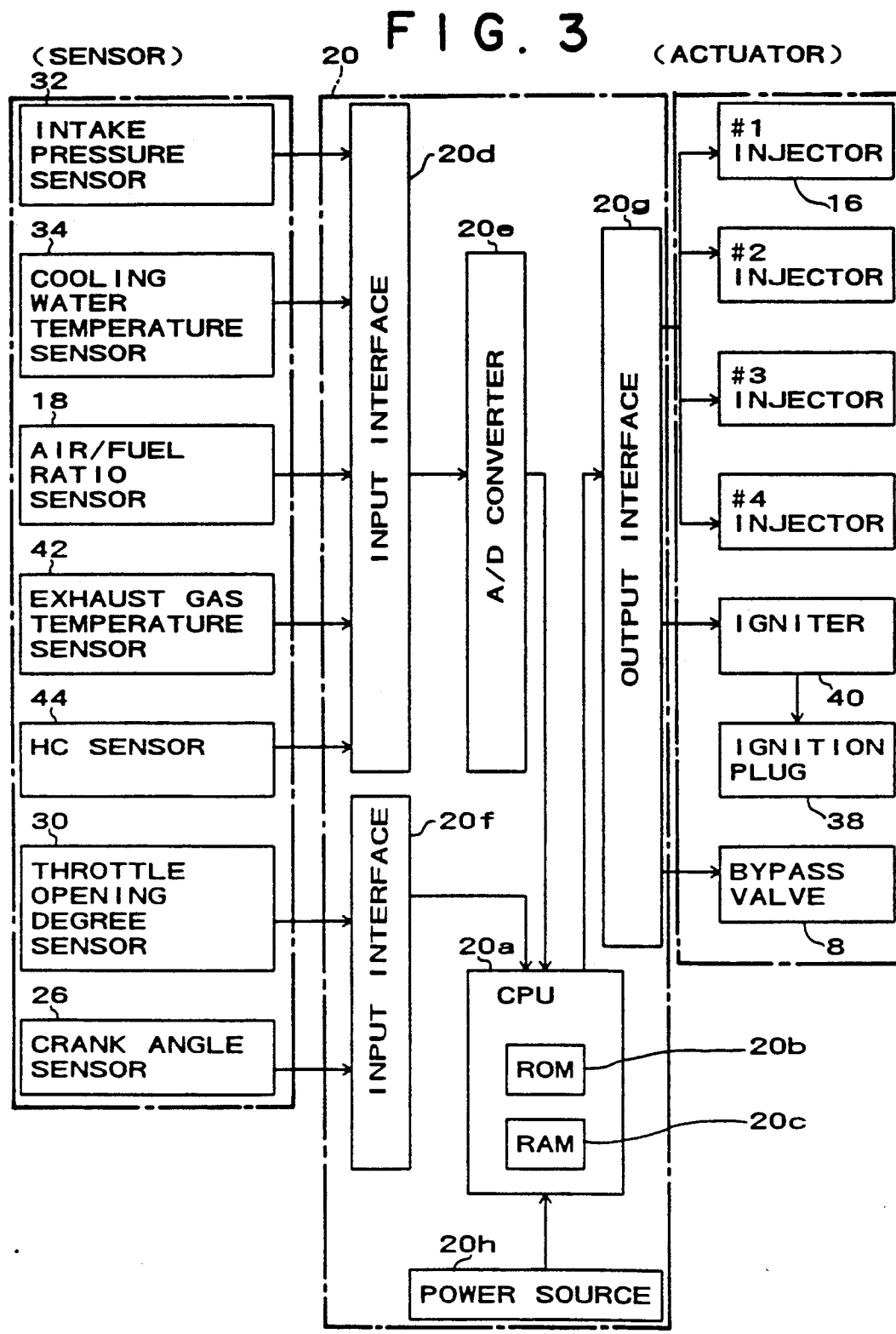

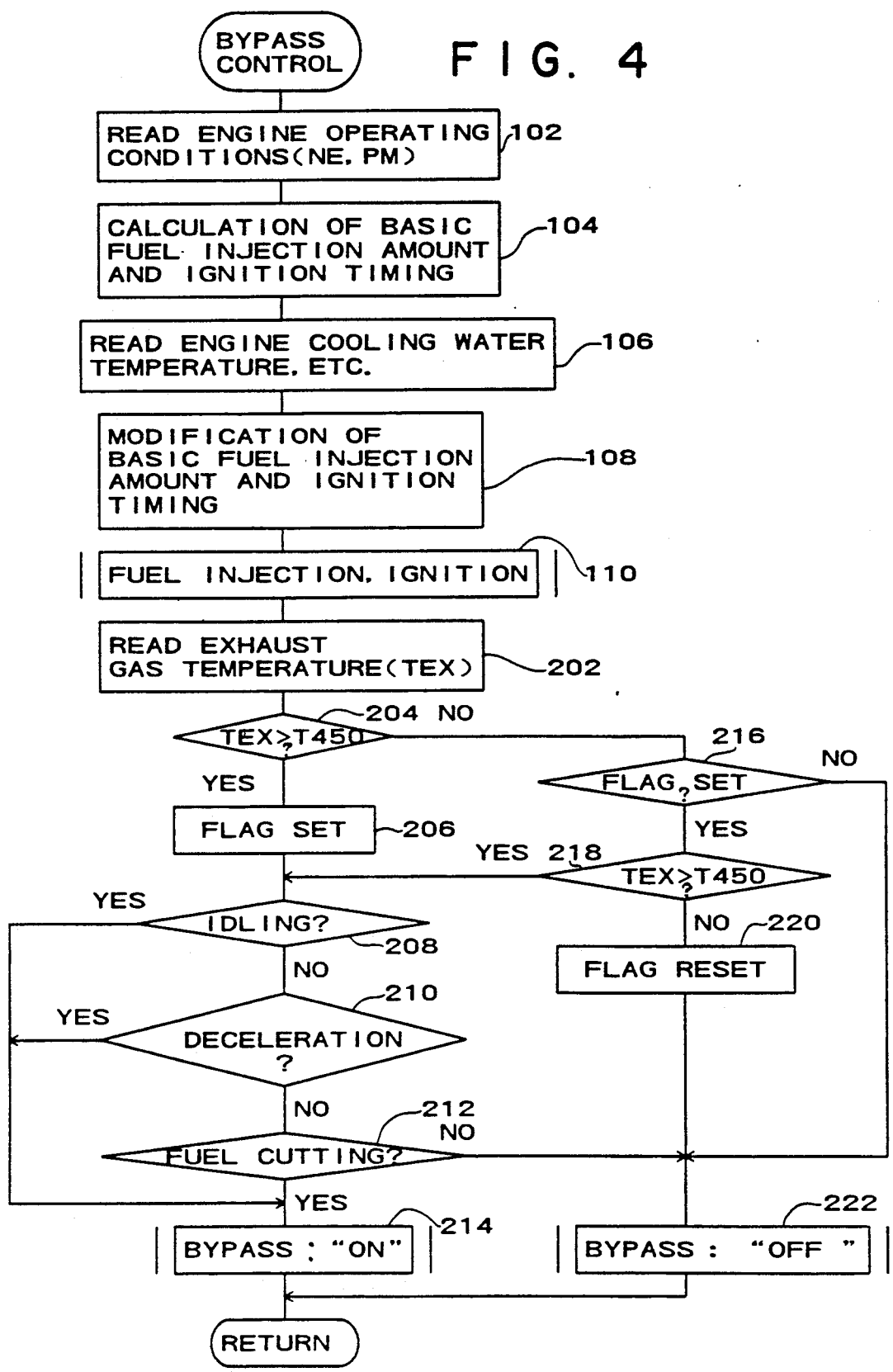

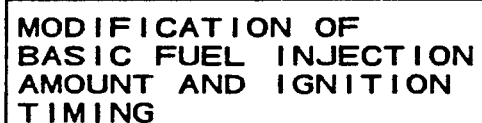
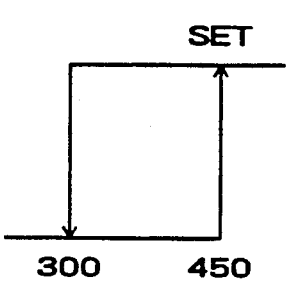
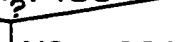
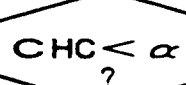
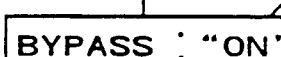
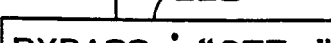

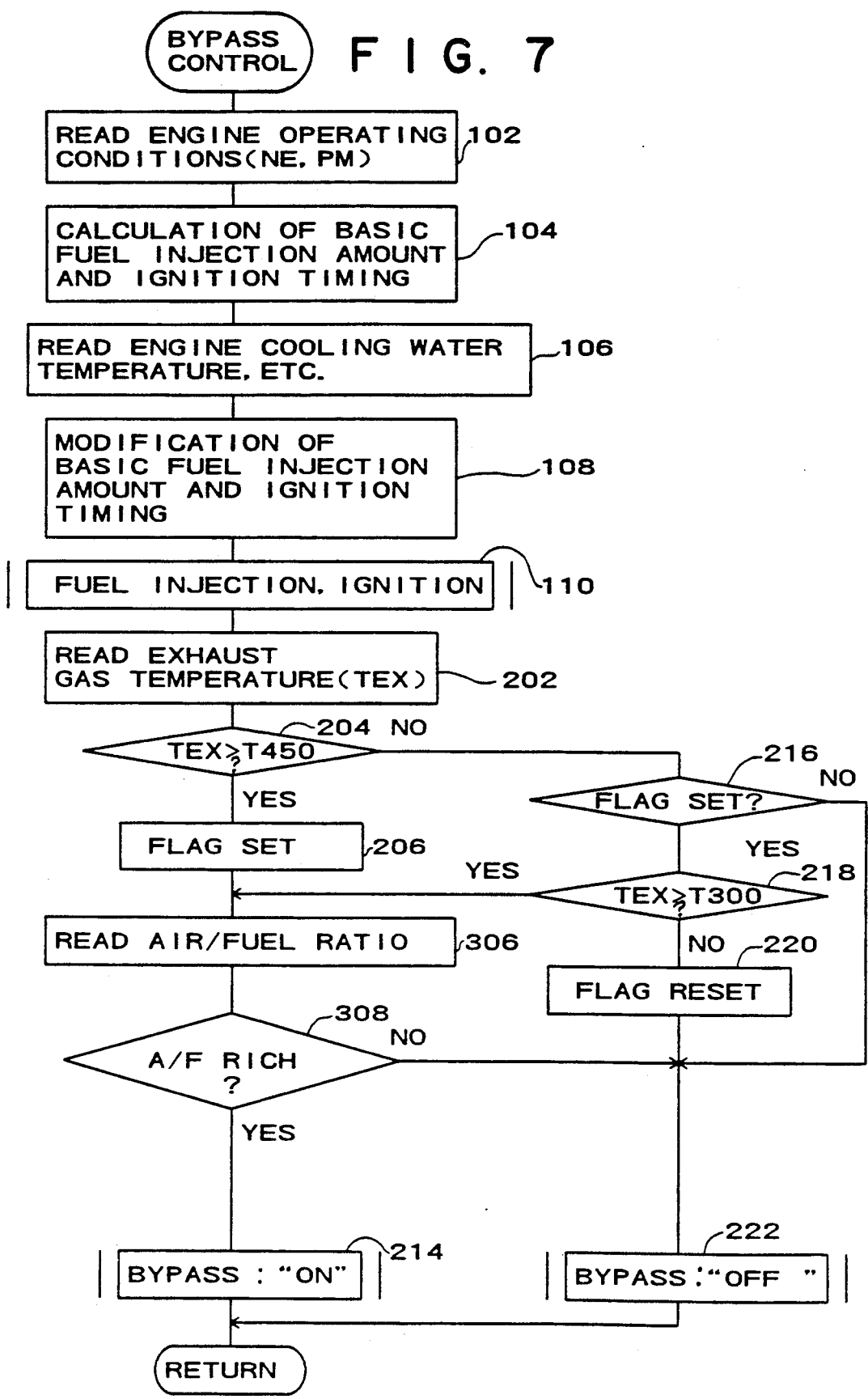

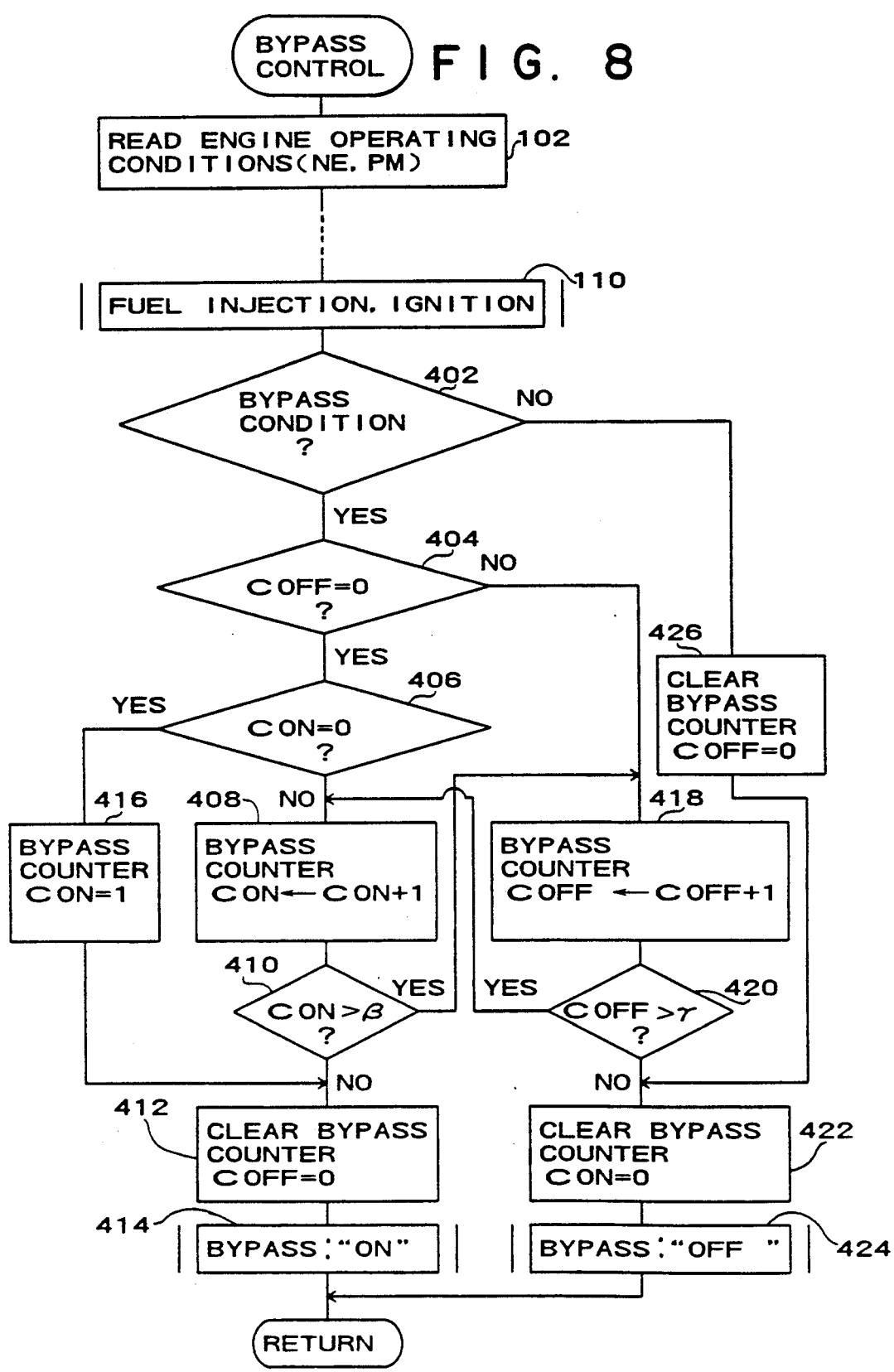

tA MAP

| T(°C)  | 400 | 500 | 600 | 700 | 800 |
|--------|-----|-----|-----|-----|-----|
| tA(S)  | 10  | 17  | 35  | 50  | 70  |

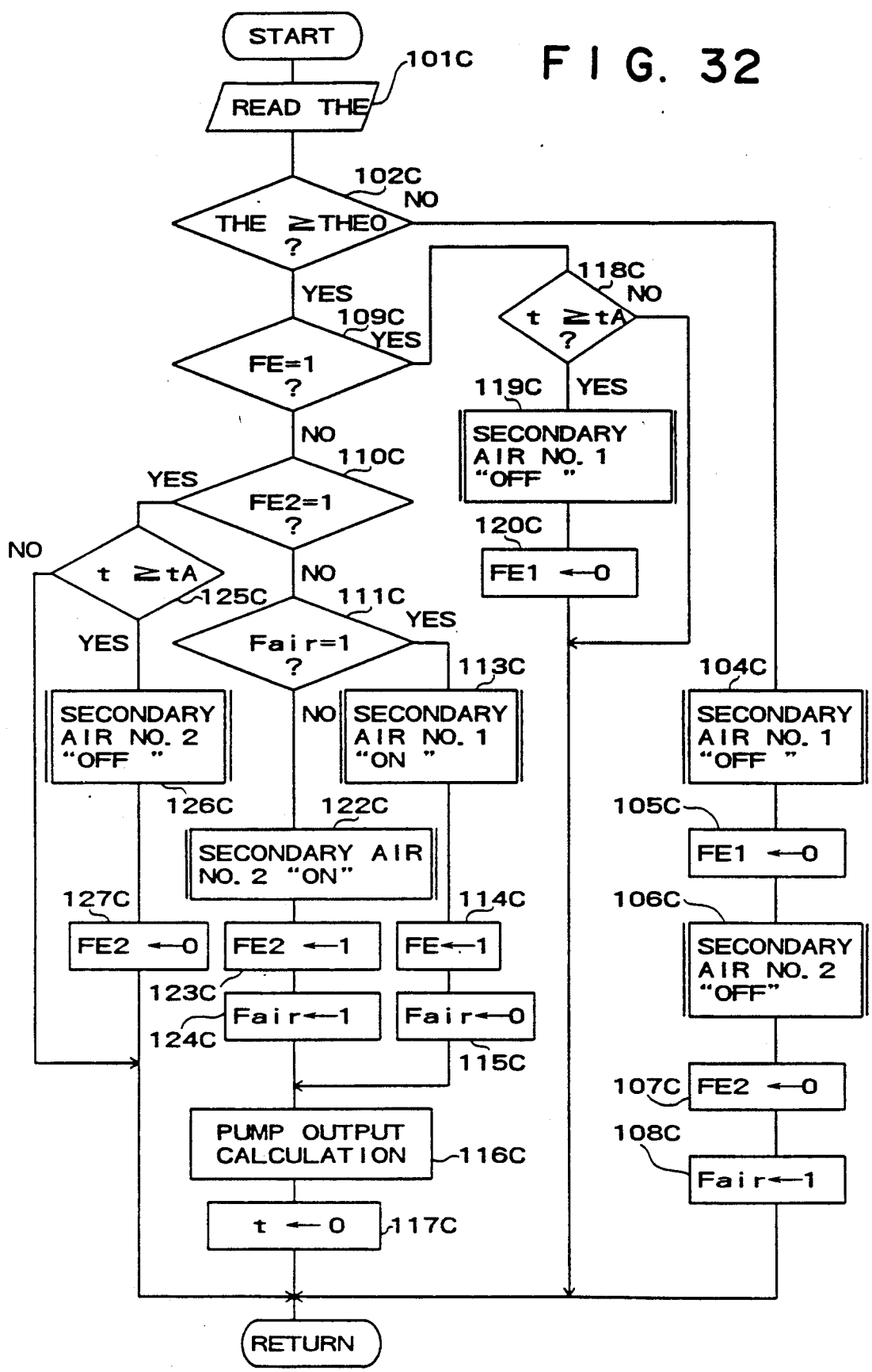

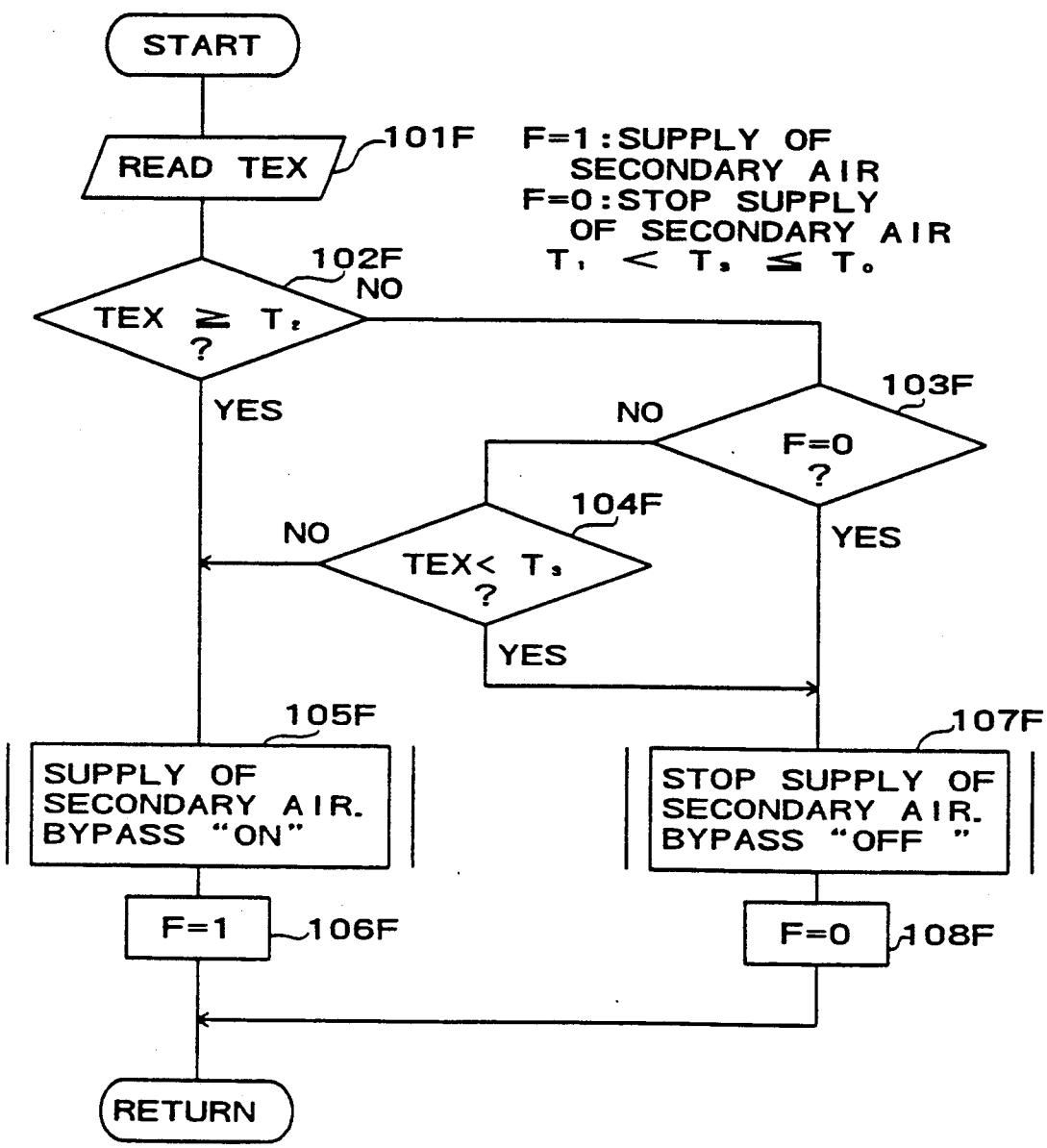

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine provided with a catalyst capable of reducing nitrogen oxides (hereinafter, NOx) under an oxidizing gas condition and in the presence of hydrocarbons. More particularly, the present invention relates to an exhaust gas purification system wherein a NOx purification rate of the catalyst is increased.

2. Description of the Prior Art

Various characteristics are demanded for automobile internal combustion engines, for example, an excellent gas mileage characteristic and a small exhaust of carbon monoxide and hydrocarbon emissions. As an engine which can satisfy these various demands, an internal combustion engine executing fuel combustion at lean air-fuel ratios (hereinafter, a lean burn engine) is noticed. However, in the lean burn engine, NOx reduction by a three-way catalyst cannot be expected, and therefore, an alternative means for reducing NOx needs to be developed.

As a catalyst capable of reducing NOx in the presence of hydrocarbons even under an oxidizing gas condition, Japanese Patent Publication HEI 1-171625 discloses a zeolite catalyst carrying transition metals. This publication also discloses protecting the catalyst from exhaust gas at high temperatures to improve the thermal durability characteristic thereof. However, the publication doesn't teach any method for increasing an NOx purification rate or NOx reduction rate of the catalyst.

SUMMARY OF THE INVENTION

An object of the invention is to provide an exhaust gas purification system with a catalyst capable of reducing NOx under an oxidizing gas condition and in the presence of hydrocarbons wherein an NOx purification rate of the catalyst is increased.

This object can be attained by an exhaust gas purification system for an internal combustion engine in accordance with the present invention which includes an internal combustion engine capable of executing fuel combustion at lean air-fuel ratios, a catalyst installed in an exhaust conduit of the engine and constructed of zeolite carrying at least one kind of metal selected from transition metals and noble metals to reduce NOx included in exhaust gas from the engine under an oxidizing gas condition and in the presence of hydrocarbons (hereinafter, a lean NOx catalyst), and means for repeatedly producing a catalyst temperature rising condition by repeatedly executing a cycle of cooling the catalyst and then stopping the cooling to allow the catalyst to rise in temperature.

According to the tests by the inventors, the lean NOx catalyst can show a higher NOx purification rate in a catalyst temperature rising course than in a catalyst temperature lowering course. In the present invention, since the cycle of cooling the lean NOx catalyst and then stopping the cooling to allow the lean NOx catalyst to rise in temperature is repeated, the catalyst temperature rising courses are positively and repeatedly produced. As a result, the NOx purification rate of the lean NOx catalyst is greatly increased.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 3 is a block diagram illustrating relationships between control elements in accordance with the first through third embodiments of the present invention;

FIG. 4 is a control flow chart of the first embodiment of the present invention;

FIG. 5 is a diagram illustrating a flag operation of the first embodiment of the present invention;

FIG. 6 is a control flow chart of the second embodiment of the present invention;

FIG. 7 is a control flow chart of a modification of the second embodiment of the present invention;

FIG. 8 is a control flow chart of the third embodiment of the present invention;

FIG. 32 is a control flow chart of the seventh embodiment;

FIG. 43 is a control flow chart of the tenth embodiment of the present invention.

DETAILED DESCRIPTION OF THE PREFERRED EMBODIMENTS

Ten embodiments will be explained below. Firstly, relationships between FIGS. and embodiments of the invention will be explained.

FIGS. 1–11 correspond to first through third embodiments wherein a bypass conduit bypassing a lean NOx catalyst is provided and exhaust gas flow is repeatedly switched between the bypass conduit and the lean NOx catalyst to repeatedly execute a cycle of cooling the catalyst and then stopping the cooling.

FIGS. 12–17 correspond to a fourth embodiment wherein a lean NOx catalyst is constructed in the form of pellets, and the catalyst pellets are circulated between a catalytic converter case and a cooling chamber to execute a cycle of cooling the catalyst and stopping the cooling.

FIGS. 18–24 correspond to a fifth embodiment wherein secondary air is intermittently injected into an exhaust gas conduit at a position upstream of a lean NOx catalyst to repeatedly execute a cycle of cooling the catalyst and then stopping the cooling.

FIGS. 25–34 correspond to sixth and seventh embodiments wherein a lean NOx catalyst is divided into a plurality of portions arranged in parallel with each other and exhaust gas flow is switched between the plurality of portions to repeatedly execute a cycle of cooling the catalyst and then stopping the cooling.

FIGS. 35–38 correspond to an eighth embodiment wherein a lean NOx catalyst is divided into a first portion and a second portion located downstream of the first portion and a bypass conduit is provided to the first portion of catalyst so that exhaust gas flow is switched between the first portion of catalyst and the bypass conduit to repeatedly execute a cycle of cooling the first catalyst and then stopping the cooling.

Figure 39:
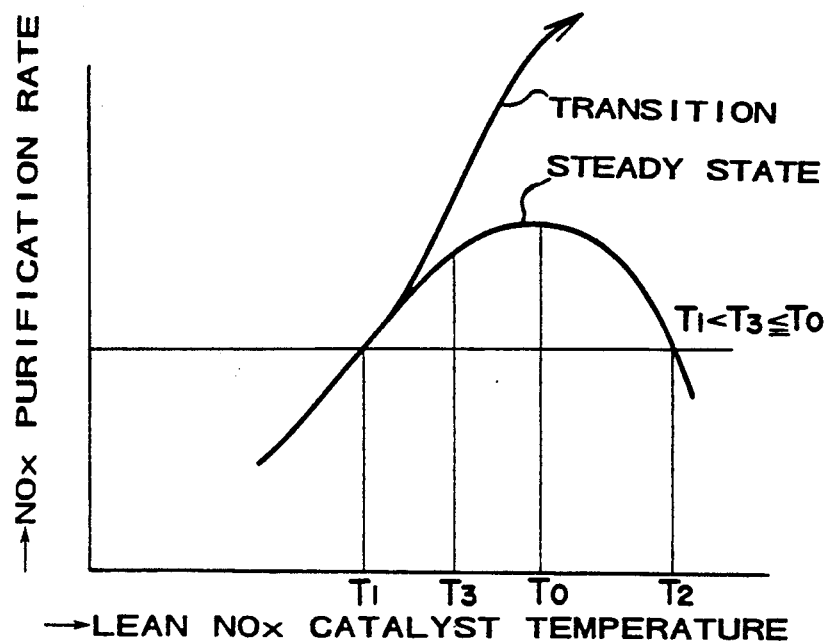
FIG. 39 is a graph illustrating a relationship between lean NOx catalyst temperature and NOx purification rate for use in explanation of ninth and tenth embodiments of the present invention.
Figure 40:
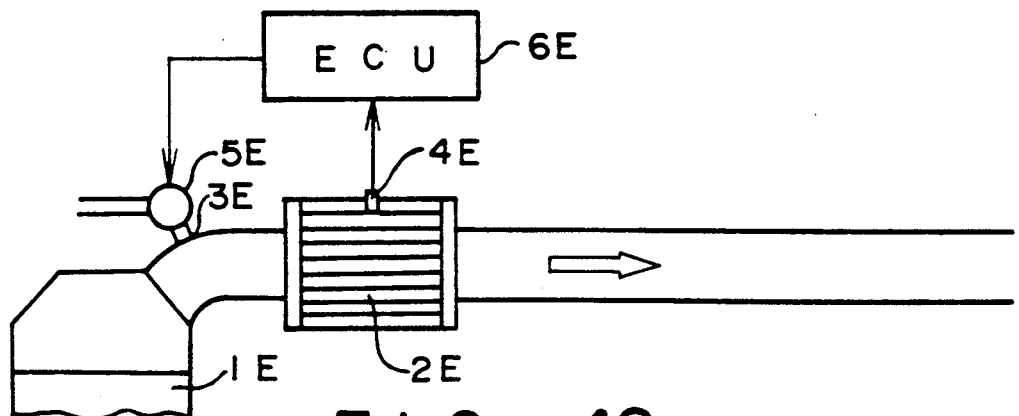
FIG. 40 is a schematic system diagram of an exhaust gas purification system for an internal combustion engine in accordance with a ninth embodiment of the present invention.
Figure 41:
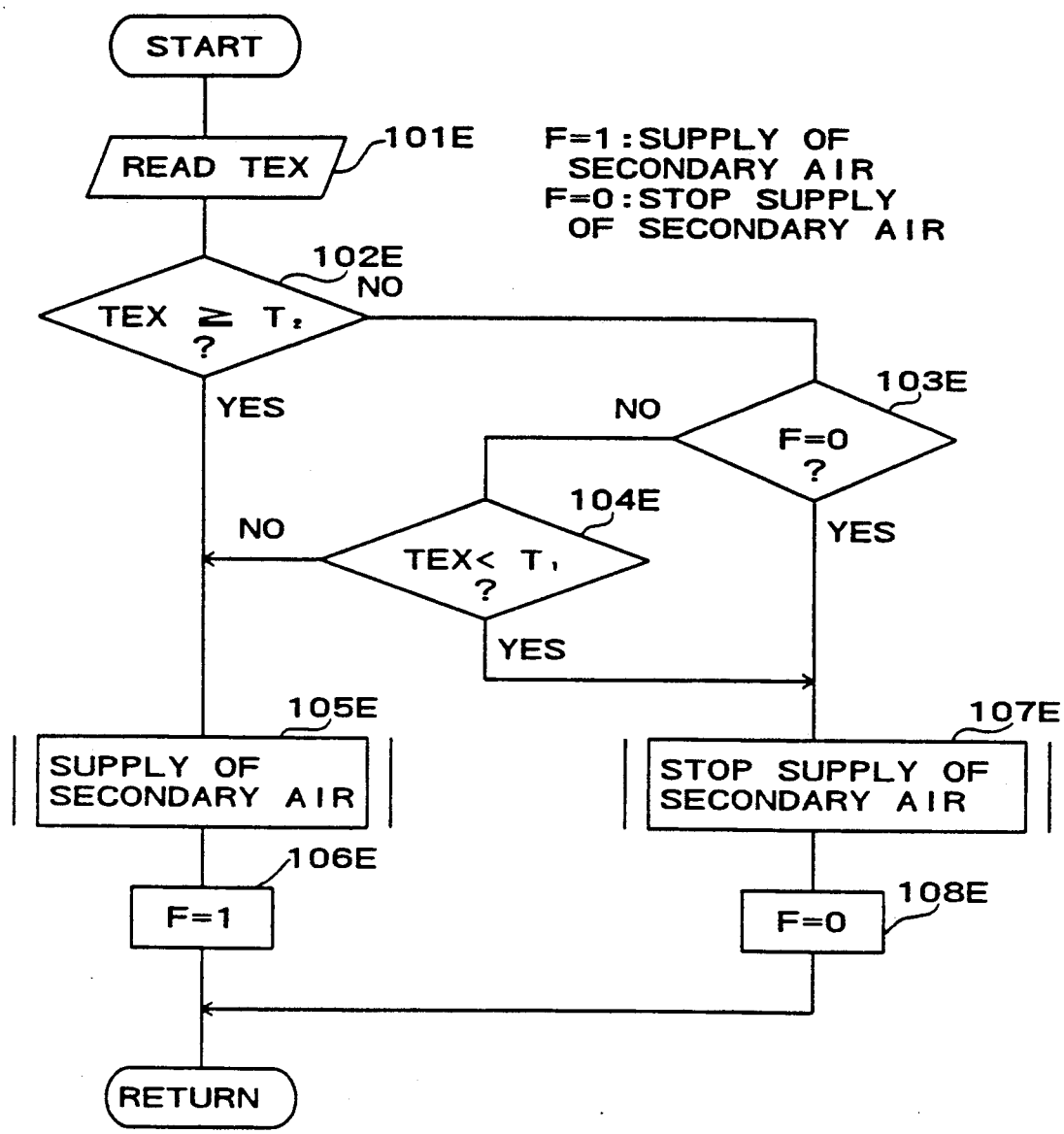
FIG. 41 is a control flow chart of the ninth embodiment of the present invention.

FIGS. 39–41 correspond to ninth and tenth embodiments wherein when the lean NOx catalyst temperature exceeds a first temperature, the lean NOx catalyst is cooled to a second temperature, and the cycle is repeated.

Each embodiment will be explained in more detail below.

FIRST THROUGH THIRD EMBODIMENTS

Figure 1:
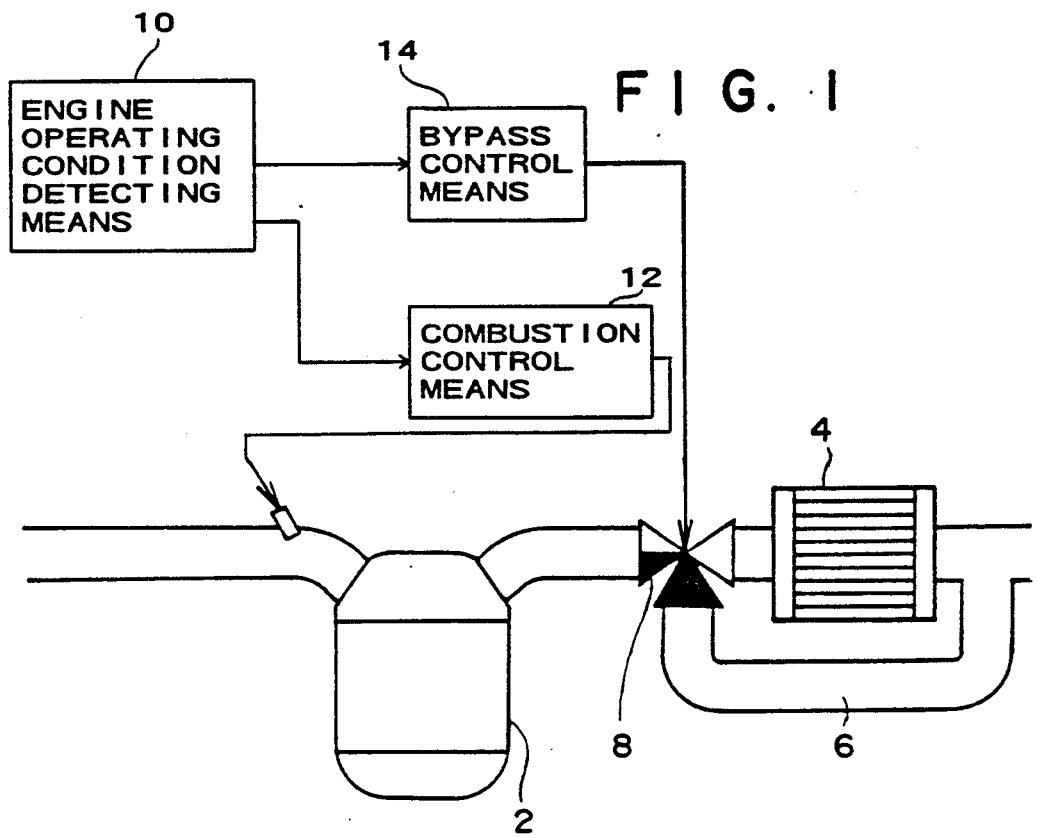
FIG. 1 is a schematic system diagram of an exhaust gas purification system in accordance with first through third embodiments of the present invention.

As illustrated in FIG. 1, an exhaust gas purification system for an internal combustion engine in accordance with the first through third embodiments generally includes an internal combustion engine 2 capable of executing fuel combustion at lean air-fuel ratios, a lean NOx catalyst 4 installed in an exhaust conduit of the engine, a bypass conduit 6 connected to the exhaust conduit so as to bypass the lean NOx catalyst 4, a bypass valve 8 adapted to switch exhaust gas flow between the lean NOx catalyst 4 and the bypass conduit 6, engine operating condition detecting means 10 for detecting the engine operating condition, catalyst temperature detecting means 42 (see FIG. 2) for detecting the temperature of the lean NOx catalyst 4 or exhaust gas, and means for repeatedly producing a catalyst temperature rising condition by repeatedly executing a cycle of cooling the catalyst 4 and then stopping the cooling to allow catalyst 4 to rise in temperature. The system further includes combustion control means 12 for calculating a fuel injection amount and fuel injection timing on the basis of the detected engine operating condition and executing the calculated fuel injection and ignition.

The means for repeatedly producing a catalyst temperature rising condition includes bypass control means 14 for controlling switching of the bypass valve 8.

More particularly, in the first embodiment, the bypass control means 14 switches on the bypass valve 8 to cause the exhaust gas to flow through the bypass conduit 6 when the engine operating condition is a condition where NOx exhaust is small and the catalyst temperature is equal to or higher than a first predetermined temperature (for example, 450° C.) and switches off the bypass valve 8 to cause the exhaust gas to flow through the lean NOx catalyst 4 when the catalyst temperature is equal to or lower than a second predetermined temperature (for example, 300° C.) which is lower than the first predetermined temperature.

In the second embodiment, the bypass control means 14 switches on the bypass valve 8 to cause the exhaust gas to flow through the bypass conduit 6 when the engine operating condition is a condition where purification of NOx by the lean NOx catalyst cannot be expected and the catalyst temperature is equal to or higher than a first predetermined temperature (for example, 450° C.) and switches off the bypass valve 8 to cause the exhaust gas to flow through the lean NOx catalyst 4 when the catalyst temperature is equal to or lower than a second predetermined temperature (for example, 300° C.) which is lower than the first predetermined temperature.

In the third embodiment, the bypass control means repeats switching on and switching off of the bypass valve 8 at regular intervals when the catalyst temperature exceeds a predetermined temperature, for example 300° C.

Figure 2:
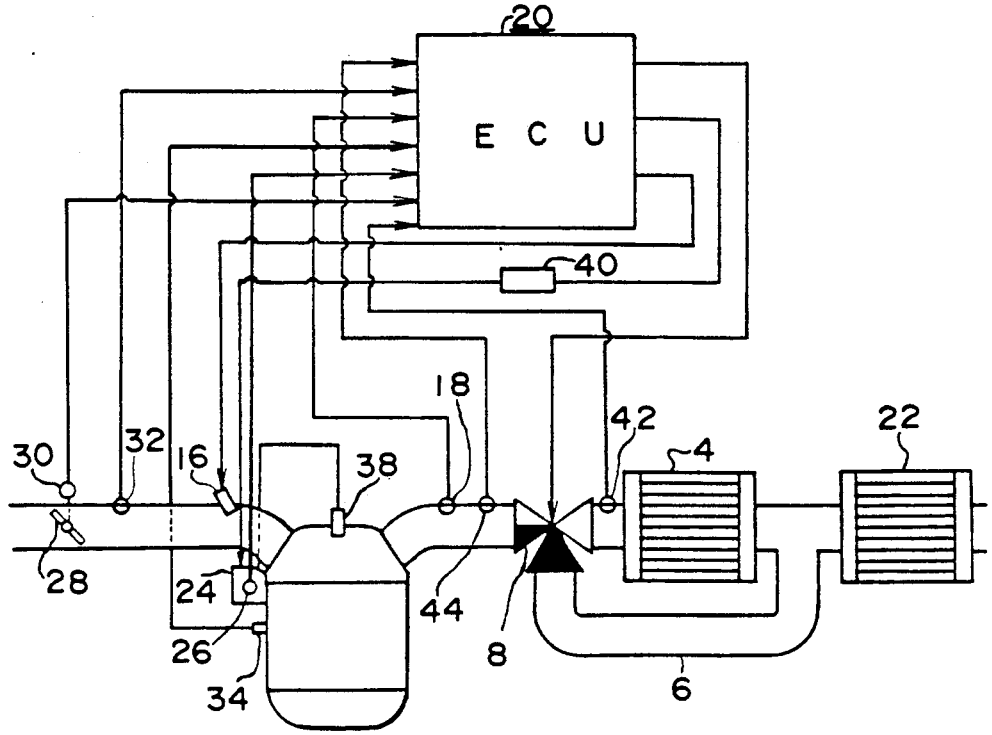
FIG. 2 is a detailed system diagram in accordance with the first through third embodiments of the present invention.

FIG. 2 illustrates more particular structures which are common to the first through third embodiments. As illustrated in FIG. 2, a throttle valve 28 and a fuel injection valve 16 are installed in an intake conduit of the engine 2. In the case of a gasoline engine, an ignition plug 38 is installed for every cylinder, though a plug is not provided in a diesel engine. A three-way catalyst 22 may be provided in a portion of the exhaust conduit downstream of the lean NOx catalyst 4, though the three-way catalyst 22 is not absolutely needed.

Fuel injection, ignition, and bypass control are performed in accordance with the instructions from an engine control computer 20 (hereinafter, ECU). The signals from various engine operating condition detecting means are fed to the ECU 20. As illustrated in FIGS. 2 and 3, the engine operating condition detecting means includes a crank angle sensor 26 which is housed in a distributor 24. The output signal from the sensor 26 is used for a timing signal for calculation of fuel injection and an engine speed NE. The engine operating condition detecting means further includes an intake pressure sensor 32 whose output signal is used for a signal of an intake pressure PM. The engine operating condition detecting means 10 further includes an engine cooling water temperature sensor 34, an air-fuel ratio sensor 18, a throttle opening degree sensor 30, an exhaust gas temperature sensor 42 (which may be a catalyst inlet gas temperature sensor, a catalyst temperature sensor, or a catalyst outlet gas temperature sensor), and a hydrocarbon sensor 44.

As illustrated in FIG. 3, the ECU 20 includes a central processor unit (CPU) 20a, a read-only memory (ROM) 20b, a random access memory (RAM) 20c, an input interface 20d for receiving analog signals, an analog/digital converter 20e, an input interface 20f for receiving digital signals, an output interface 20g, and a power source 20h. Calculation is executed at CPU 20a, and the outputs are sent through the output interface 20g to each fuel injection valve 16 to control the fuel injection and to the igniter 40 to control the ignition timing. Further, the outputs of the ECU 20 are sent to an actuator of the bypass valve 8 to perform the bypass control.

Calculation at the CPU 20a is performed in accordance with any one of the flow charts shown in FIGS. 4 and 6 to 8. Each routine includes a first portion for fuel injection and ignition timing control and a second portion for bypass control. The first portion is common to the first through third embodiments of the invention.

The first portion will be explained with reference to, for example, FIG. 4. In FIG. 4, at step 102, the signals from the engine operating condition detecting means 10 are read. The signals include at least signals of engine speed NE and intake pressure PM. Then, at step 104, a basic fuel injection amount TP is calculated on the basis of intake pressure PM and engine speed NE so that a theoretical air-fuel ratio is obtained. Also, an injection timing is calculated at step 104. The basic fuel injection amount TP is usually modified taking various engine operating conditions into account. More particularly, at step 106, a signal THW from the engine cooling water temperature sensor and other signals are read. Then, at step 108, the basic fuel injection amount TP and the ignition timing are modified by taking the engine cooling water temperature THW, the engine speed modification factor KLEANNE, the intake pressure modification factor KLEANPM, the acceleration modification factor FACC, the throttle opening degree modification factor FPOWER, and the catalyst overheat prevention factor OTP into account, using the following equation:

$$TAU = TP*KLEANNE*KLEANPM*FWL*(1 + FACC + FPOWER + OTP)$$

Then, at step 110, TAU is set and fuel injection is performed for the period of time TAU, and ignition is executed. These steps 102 to 110 constitute the combustion control means 12 of FIG. 1.

Then, the routine proceeds to a bypass control routine, that is, the second portion of the routine in which the first through third embodiments differ from each other.

In the first embodiment, the lean NOx catalyst 4 is cooled in accordance with a flow control shown in FIG. 4 when an NOx exhaust amount is small and therefore reduction of NOx is not necessary. More particularly, at step 202, the exhaust gas temperature TEX is read. Then, the routine proceeds to a step 204 wherein it is determined whether the temperature TEX is greater then the first predetermined temperature $T_{450}$, for example 450° C. When TEX is greater than $T_{450}$, the routine proceeds to a step 206, and a flag F is set. When TEX is equal to or smaller than $T_{450}$ at step 204, the routine proceeds to a step 216 wherein it is judged whether or not the flag F is set. When it is determined at step 216 that the flag F is set, the routine proceeds to a step 218 wherein it is determined whether TEX is greater than a second predetermined temperature $T_{300}$, for example 300° C., is determined. When TEX is equal to or smaller than $T_{300}$, for example 300° C. the routine proceeds to a step 220 where the flag F is reset. Due to the above-described flag procedure, setting and resetting of the flag draws a hysteresis loop in a temperature rising and lowering cycle as shown in FIG. 5. When the flag F is in a set condition and an NOx exhaust amount is small, the bypass valve 8 is switched on so that the exhaust gas is caused to flow through the bypass conduit 6 to allow the lean NOx catalyst 4 to be cooled through natural heat release.

To execute the above-described cooling, when the flag F is in a set condition, the routine proceeds to a step 208, then to a step 210, and then to a step 212, wherein it is determined whether the engine operating condition is in a small NOx exhaust condition, such as an idling, deceleration, or fuel cutting condition. When a NOx exhaust amount is small, it is allowed to cause the exhaust gas not to flow through the lean NOx catalyst 4. Therefore, the routine proceeds to a step 214, where the bypass valve 8 is switched on. Since the exhaust gas flows through the bypass conduit 6 during "ON" of the bypass valve 8, the lean NOx catalyst 4 gradually decreases in temperature through heat release. On the other hand, when the flag F is in a reset condition, the routine proceeds to a step "222", where the bypass valve 8 is switched off. Since the exhaust gas flows through the lean NOx catalyst 4 during "OFF" of the bypass valve 8, the lean NOx catalyst temperature increases. After the procedure at step 214 or 216 is completed, the routine proceeds to a final step where the routine returns to another routine. The steps 202 to 222 correspond to the bypass control means 14 of FIG. 1.

In the second embodiment, cooling and temperature rising control of the lean NOx catalyst 4 is executed in accordance with a flow chart shown in FIG. 6 when reduction of NOx cannot be expected and therefore it is useless to cause the exhaust gas to flow through the lean NOx catalyst 4. Since steps 102 to 110 of FIG. 6 correspond to the steps 102 to 110 of FIG. 4, and steps 202 to 206 and 214 to 222 of FIG. 6 correspond to the steps 202 to 206 and 214 to 222 of FIG. 4, the description thereof will be omitted. In the steps of FIG. 6, only steps 302 and 304 differ from the steps of FIG. 4.

More particularly, the hydrocarbon concentration $C_{HC}$ of the exhaust gas is read at step 302. Then, the routine proceeds to a step 304 wherein it is determined whether the concentration of $C_{HC}$ is smaller than a predetermined hydrocarbon concentration "alpha." When the concentration of $C_{HC}$ is smaller than the predetermined concentration, NOx reduction cannot be expected. Therefore, the routine proceeds to a step 214 where the bypass valve 8 is switched on. On the other hand, when the concentration of $C_{HC}$ is determined to be equal to or greater than "alpha" at step 302, the routine proceeds to a step 222 where the bypass valve 8 is switched off.

FIG. 7 illustrates a modification of the second embodiment where the exhaust gas is caused to flow through the bypass conduit 6 when the air-fuel ratio is rich and therefore NOx reduction cannot be expected. More particularly, in FIG. 7, an air-fuel ratio is read at step 306. Then, at the next step 308, whether or not the air-fuel ratio is rich is determined. When the air-fuel ratio is determined to be rich, NOx reduction by the lean NOx catalyst cannot be expected, and the routine proceeds to the step 214 where the bypass valve 8 is switched on. When the air-fuel ratio is determined to be lean at step 308, the routine proceeds to the step 222 where the bypass valve 8 is switched off. Since other steps are the same as those of FIG. 6, the description therefor will be omitted.

In the third embodiment, a cycle of "ON" and "OFF" of the bypass valve 8 is repeatedly executed in accordance with a flow chart of FIG. 8. Since steps 102-110 of FIG. 8 correspond to the steps 102-110 of FIG. 4, the description therefore will be omitted.

In FIG. 8, at step 402, whether or not the current engine operating condition is in a bypass condition, more particularly whether or not the exhaust gas temperature TEX is at a temperature between 300° C. and 600° C. is determined. When the engine operating condition is not in the bypass condition, it is useless to repeat the bypass ON/OFF cycle. Therefore, the routine proceeds to a step 426 where a bypass counter $C_{OFF}$ is cleared, then to a step 422 where a bypass counter $C_{ON}$ is cleared, and then to a step 424 where the bypass valve 8 is switched off.

When the engine operating condition is determined to be in the bypass condition at step 402, the routine proceeds to a step 404 to repeatedly execute the bypass "ON" and "OFF" cycle. When the routine proceeds to the step 404 for the first time, the bypass counters $C_{OFF}$ and $C_{ON}$ have been cleared at steps 404 and 406, and therefore the routine proceeds to a step 416. At step 416, the bypass counter $C_{ON}$ is set to "1" and then at step 412, the bypass counter $C_{OFF}$ is cleared, and finally at step 414, the bypass valve 8 is switched on.

When the routine proceeds to a step 406 at the next cycle of calculation, the bypass counter $C_{ON}$ is negatively judged, and the routine proceeds to a step 408, where the bypass counter $C_{ON}$ is increased by one. Until the increasing bypass counter $C_{ON}$ finally exceeds a predetermined value "beta" at step 410, the routine proceeds to steps 412 and 414, and the bypass valve 8 is held "ON".

When the increased bypass counter $C_{ON}$ finally exceeds "beta" at step 410, the routine proceeds to a step 418 where the bypass counter $C_{OFF}$ is increased by one. Because the bypass counter $C_{OFF}$ is at "1" at step 404 in the next cycle of calculation, the routine proceeds from the step 404 to a step 418, where the bypass counter $C_{OFF}$ is increased by one. Then, the routine proceeds to a step 420. Until the increasing bypass counter $C_{OFF}$ finally exceeds a predetermined valve "gamma", the routine proceeds to step 422 and then to step 424, and the bypass valve 8 is held "OFF". When the bypass counter $C_{OFF}$ finally exceeds "gamma" at step 420, the routine proceeds to the step 408. As a result, the bypass valve continues "ON" for the period of time "beta" then the bypass valve continues "OFF" for the period of time "gamma", and a cycle of "ON" and "OFF" is repeated.

During the "ON" period of the bypass valve, the exhaust gas flows through the bypass conduit 6, and the temperature of the lean NOx catalyst 4 gradually decreases through natural heat release. On the other hand, during the "OFF" period of the bypass valve, the exhaust gas flows through the lean NOx catalyst 4, and the temperature of the lean NOx catalyst 4 increases, heated by the exhaust gas and due to exothermic reaction of the hydrocarbon at the catalyst. Since a cycle of cooling and non cooling is repeated, the temperature rising courses are positively and repeatedly produced, and the NOx purification rate of the lean NOx catalyst is greatly increased.

The operation of the first through third embodiments will now be explained.

When the temperature of the lean NOx catalyst 4 or the exhaust gas exceeds the first temperature (for example, 450° C.), the exhaust gas is caused to flow through the bypass conduit 6 and the lean NOx catalyst temperature lowers. When the temperature of the lean NOx catalyst 4 lowers to the second temperature (for example, 300° C.), the exhaust gas is caused to flow through the lean NOx catalyst 4, and the lean NOx catalyst temperature is increased.

Figure 9:
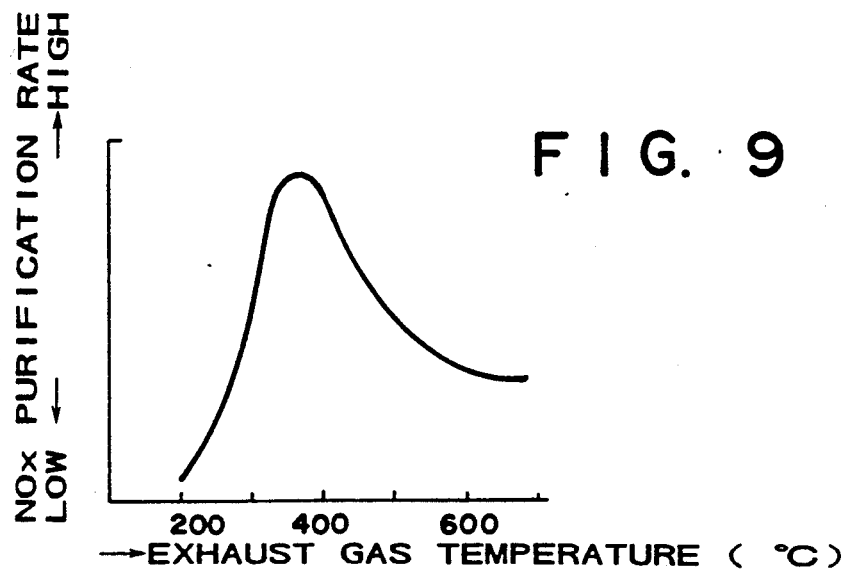
FIG. 9 is a diagram illustrating a relationship between exhaust gas temperature and NOx purification rate.
Figure 10:
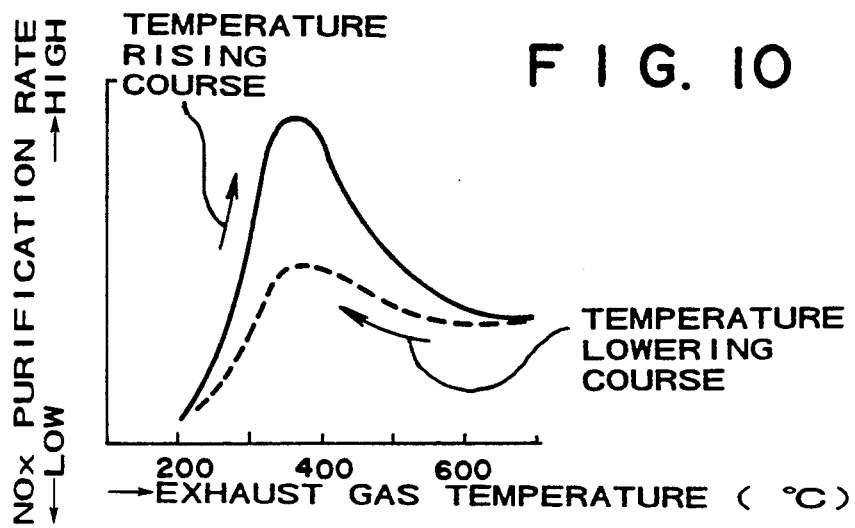
FIG. 10 is a diagram illustrating a difference between a NOx purification characteristic in temperature lowering course and a NOx purification characteristic in temperature rising course.
Figure 11:
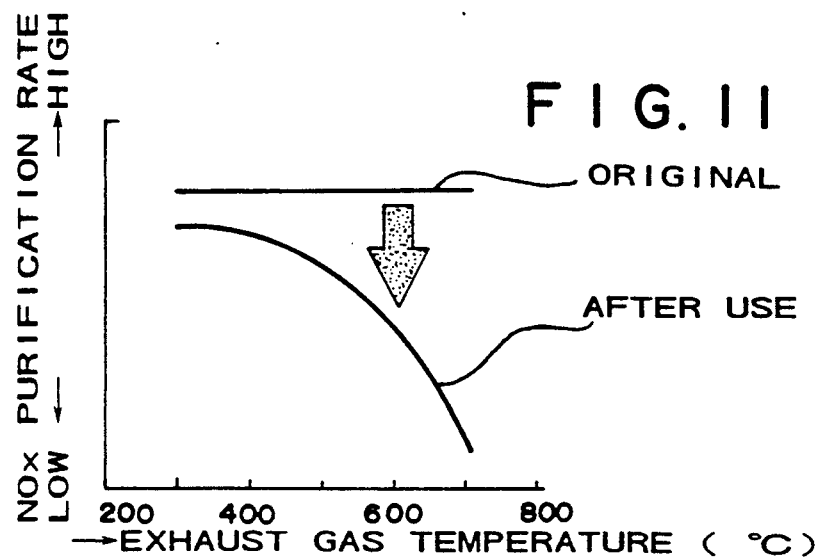
FIG. 11 is a diagram illustrating degradation of a lean NOx catalyst.

In this way, the temperature of the lean NOx catalyst 4 is controlled to be in a temperature range between the first temperature and the second temperature, where the lean NOx catalyst 4 can show a high NOx purification rate as shown in FIG. 9. Further, since the temperature of the lean NOx catalyst 4 is caused to repeat lowering and rising, the temperature rising courses are positively produced. The temperature rising course further increases the NOx reduction rate of the lean NOx catalyst.

As a result, in accordance with any one of the first through third embodiments, the NOx reduction rate is greatly increased.

FOURTH EMBODIMENT

Figure 12:
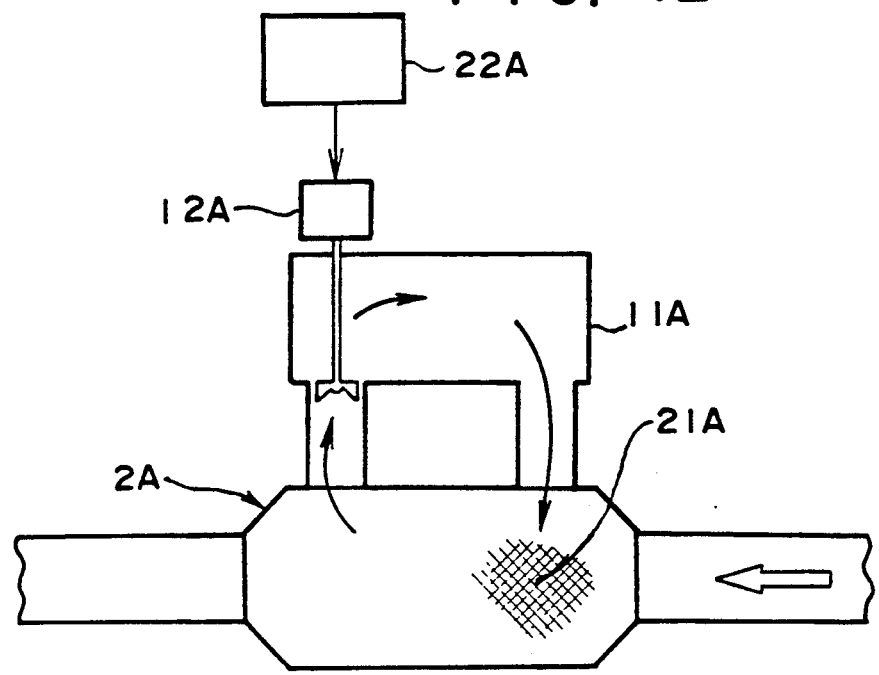
FIG. 12 is schematic system diagram of an exhaust gas purification system for an internal combustion engine in accordance with a fourth embodiment of the present invention.

As illustrated in FIG. 12, an exhaust gas purification system for an internal combustion engine in accordance with the fourth embodiment generally includes an internal combustion engine 1A capable of executing fuel combustion at lean air-fuel ratios, a lean NOx catalyst constructed in the form of pellets 21A, a catalytic converter case 2A for housing the catalyst pellets 21A therein, a cooling chamber 11A communicating with the catalytic converter case 2A, circulating means 12A for circulating the catalyst pellets 21A between the converter case 2A and the cooling chamber 11A, and circulating velocity control means 23A (see FIG. 13) for controlling the circulation velocity of the catalyst pellets 21A. The cooling chamber 11A and the circulating means 12A constitute the catalyst temperature rising condition repeatedly producing means. The lean NOx catalyst 21A is cooled in the cooling chamber 11A and is allowed to rise in temperature in the converter case 2A.

Figure 13:
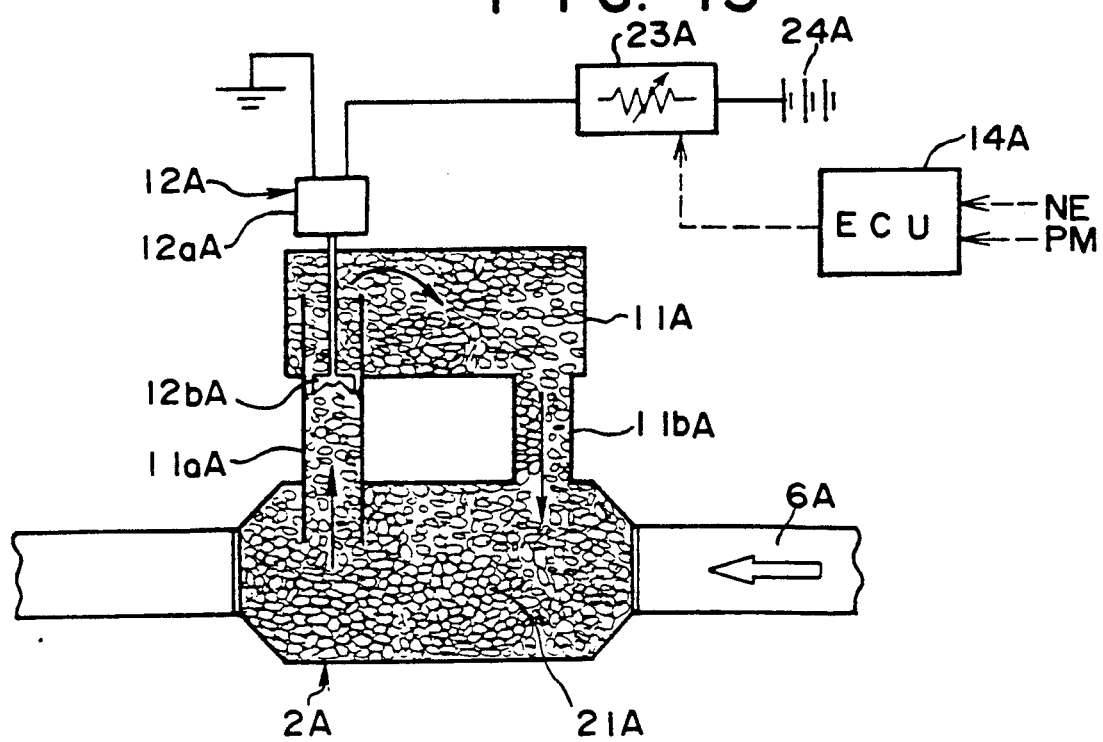
FIG. 13 is a detailed system diagram of the fourth embodiment of the present invention.
Figure 15:
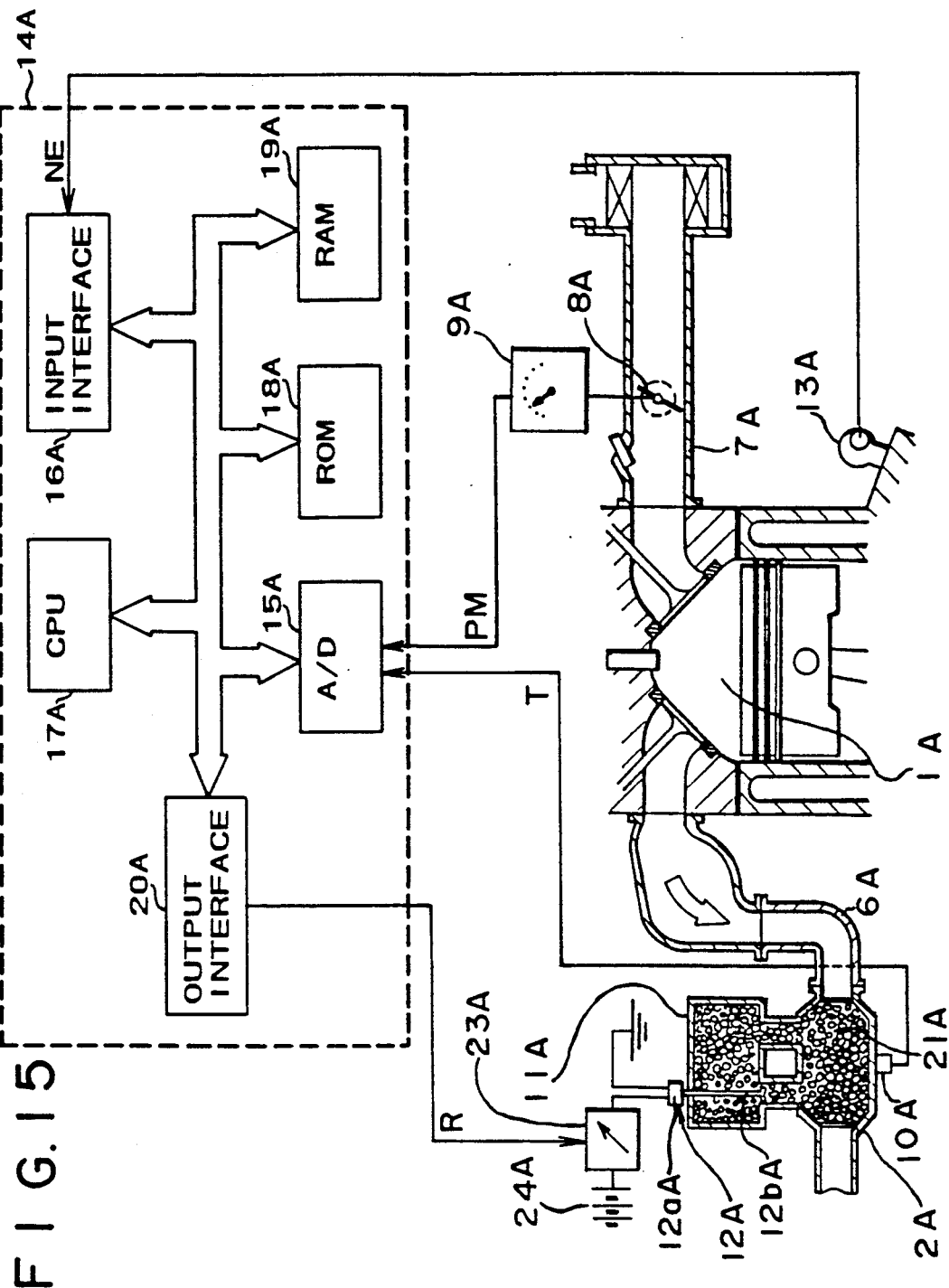
FIG. 15 is an entire system diagram of the fourth embodiment of the present invention.

More particularly, as illustrated in FIGS. 13 and 15, the lean NOx catalyst 21A is installed in the converter case 2A provided in an exhaust conduit 6A. The cooling chamber 11A communicates with the interior of the converter case 2A via pipes 11aA and 11bB. The circulating means ! 2A includes a screw 12bA driven by a motor 12aA. Variable resistance means 23A is provided in an electrical circuit connecting the motor 12aA and a battery 24A so that the rotational speed of the screw 12bA is changed to thereby vary the circulation speed of the catalyst pellets 21A. The resistance is varied by outputs of an engine control computer (hereinafter, ECU) 14A. The variable resistance means 23A constitutes the circulation speed control means 22A.

Also, in an intake conduit 7A, a throttle valve 8A is installed. The opening degree of the throttle valve 8A is detected by a throttle opening degree sensor 9A whose output is used for an engine load signal PM. The temperature T of the lean NOx catalyst 21A is detected by a catalyst temperature sensor 10A. A distributor houses a crank angle sensor 13A whose output is used as a signal for entering the calculation and a signal for defining the engine speed NE. These signals are fed to the ECU.

Figure 14:
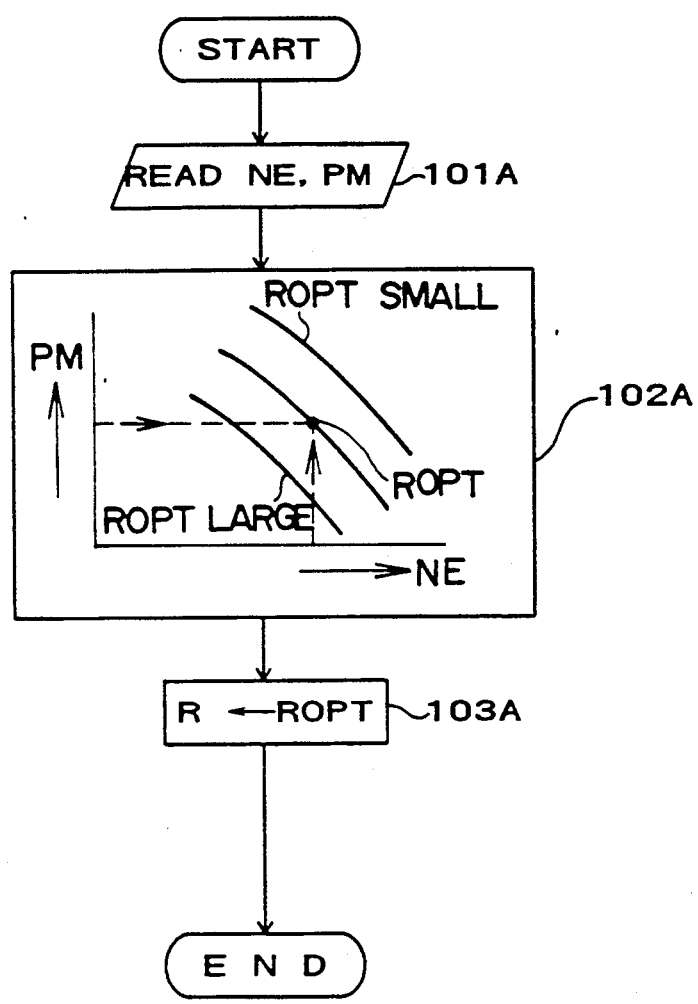
FIG. 14 is a control flow chart of the fourth embodiment of the present invention.

The ECU 14A includes an analog/digital converter 15A, an input interface 16A, a CPU 17A, a ROM 18A, a RAM 19A, and an output interface 20A. The CPU 17A calls therein the program of FIG. 14 which is stored in the ROM 18A. In FIG. 14, at step 101A, the engine speed NE and the engine load PM are read. Then, the routine proceeds to a step 102A, where an optimum resistance ROPT of the variable resistance 23A is calculated to obtain an optimum circulation speed which controls the temperature of the lean NOx catalyst 21A to a temperature which can realize a highest NOx purification rate. Then, the routine proceeds to a step 103A where the resistance of the variable resistance means 23A is adjusted to the optimum resistance ROPT.

The operation of the fourth embodiment will now be explained. The exhaust gas from the internal combustion engine 1A flows through the exhaust conduit 6A to the catalytic converter and is purified by the lean NOx catalyst 21A. Since the exhaust gas of a lean burn engine includes an oxidizing gas, HC and CO are almost completely oxidized (burned), and usually CO and HC emissions are below regulation values therefor. NOx included in the exhaust gas is purified according to a mechanism shown in FIG. 16.

More particularly, some active species (for example, species like $CO^-$) is needed for the NOx reduction by the lean NOx catalyst 21A. The active species is produced through partial oxidation of yet unburned hydrocarbon. The lower the temperature of the lean NOx catalyst is, the more the partial oxidation is promoted (see characteristic H of FIG. 17) and the more the active species is produced and stored in the cells of the catalyst. However, when the catalyst temperature is too low, the lean NOx catalyst loses its activity (see characteristic D of FIG. 17). As a result, the lean NOx purification rate characteristic has the form of a mountain as shown by curve B in FIG. 17.

Since the catalyst temperature is controlled to approach the temperature TOPT corresponding to the top of the mountain by controlling the circulation velocity, the NOx reduction rate is held high. Further, since the lean NOx catalyst 21A is alternately cooled and then allowed to rise in temperature when circulated, the NOx reduction rate is further improved.

FIFTH EMBODIMENT

Figure 18:
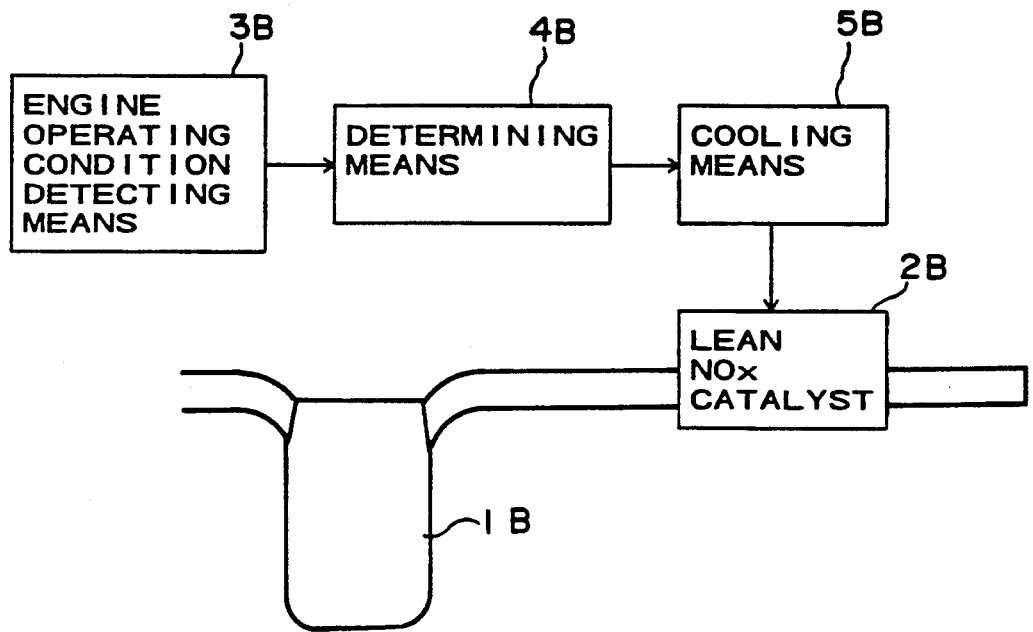
FIG. 18 is a system block diagram of an exhaust gas purification system for an internal combustion engine in accordance with the fifth embodiment of the present invention.
Figure 24:
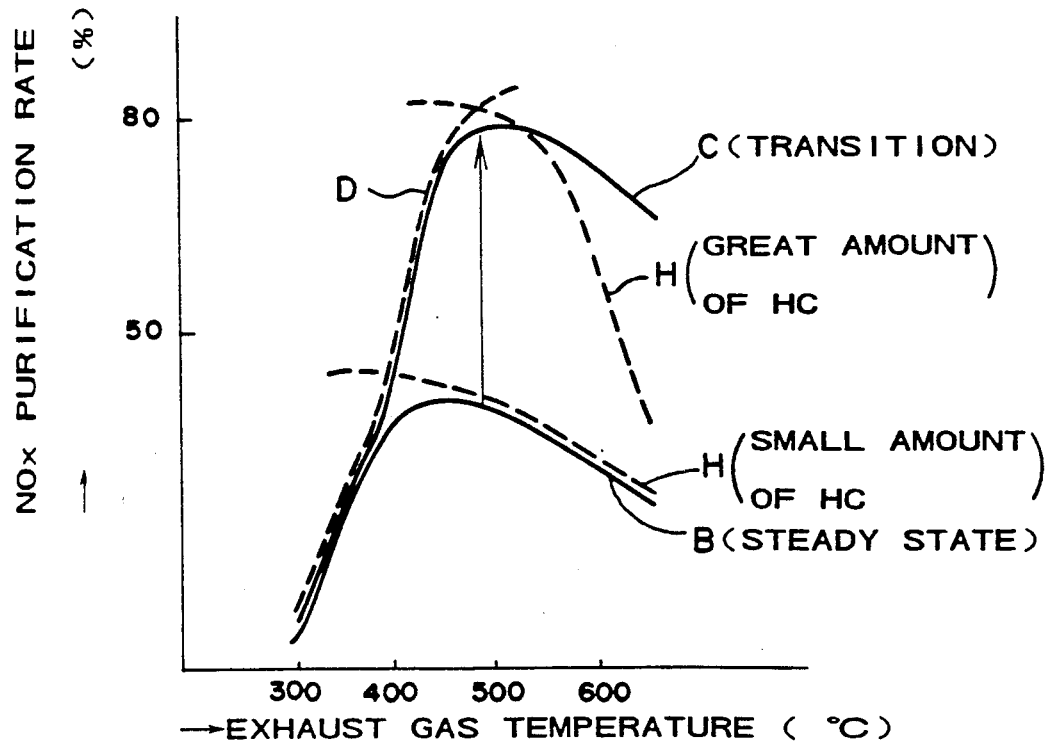
FIG. 24 is a graph illustrating a detailed relationship between exhaust gas temperature and NOx purification rate.

As shown in FIG. 18, an exhaust gas purification system for an internal combustion engine in accordance with the fifth embodiment generally includes an internal combustion engine 1B capable of executing fuel combustion at lean air-fuel ratios, a lean NOx catalyst 2B installed in an exhaust conduit of the engine, engine operating condition detecting means 3B for detecting an operating condition of the engine, determining means 4B for determining whether or not the detected engine operating condition is in an idling condition or deceleration condition, and cooling means 5B for cooling the lean NOx catalyst 2B when the engine operating condition is determined to be in an idling condition or deceleration condition by the determining means 4B.

Figure 22:
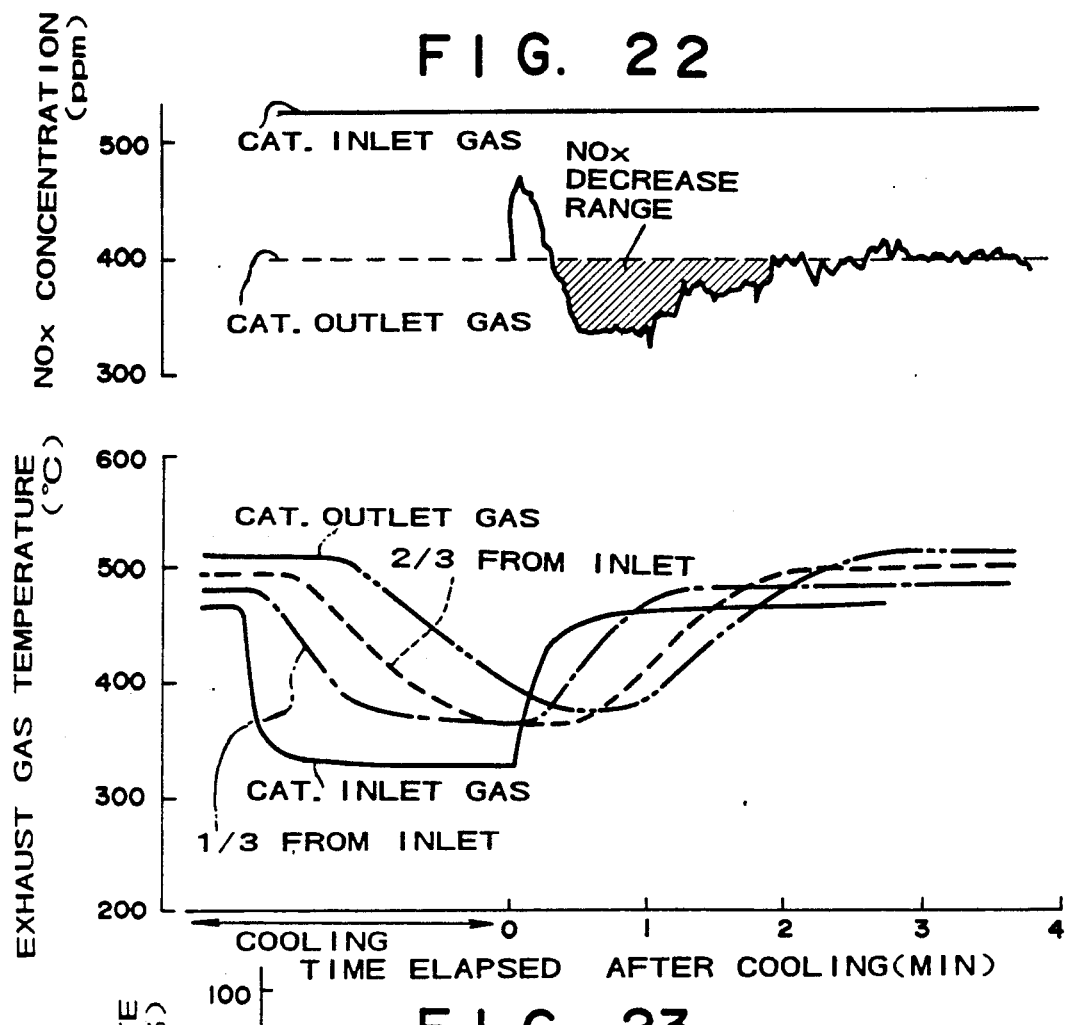
FIG. 22 is a graph illustrating a NOx concentration characteristic and a lean NOx catalyst temperature characteristic with respect to time elapsed after beginning of cooling.
Figure 23:
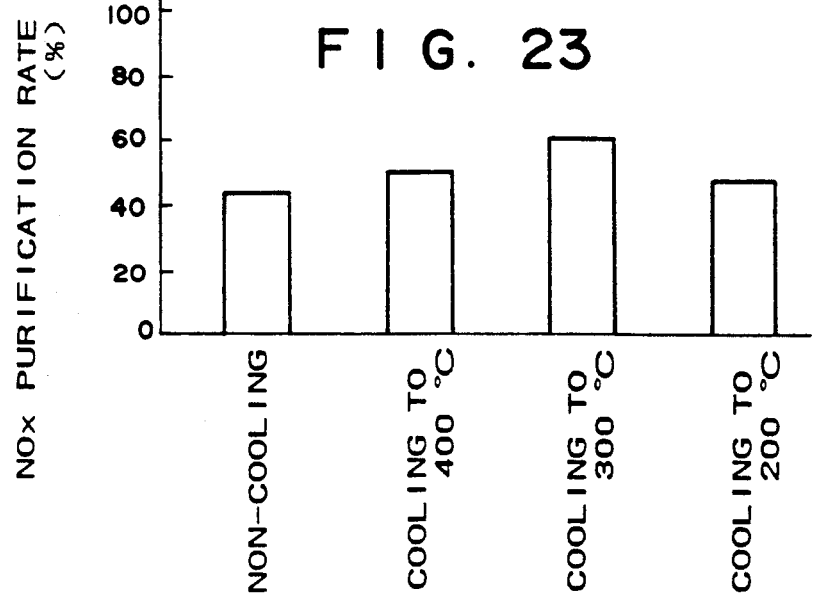
FIG. 23 is a graph illustrating a relationship between lean NOx catalyst temperature and NOx purification rate.

Through various tests, it was found by the inventors that the NOx reduction rate of the lean NOx catalyst 2B under a transition condition was greatly different from that of a normal condition. As illustrated in FIG. 22, when secondary air was introduced into the exhaust gas at a position upstream of the lean NOx catalyst to cool the catalyst, NOx in the exhaust gas was seen to be decreased during a few minutes after stopping the cooling. More particularly, the NOx reduction rate was found to increase from characteristic B to characteristic C in FIG. 24 for a few minutes.

The reason why the NOx reduction rate increases is believed to be as follows: During cooling, the lean NOx catalyst temperature lowers, and partial oxidation of hydrocarbon is promoted in the catalyst. As a result, a relatively great amount of active species is produced and stored in the small cells of the catalyst. Since activity of the lean NOx catalyst is small (see characteristic D of FIG. 24) when the catalyst is cooled, decrease in NOx exhaust cannot be seen in spite of the stored active species. However, after the cooling is stopped, the temperature of the lean NOx catalyst gradually increases. As s result, until the stored active species is expended, NOx reduction rate momentarily increases from normal characteristic B to transient characteristic C of FIG. 24. After all the active species has been expended, the purification characteristic returns to the normal characteristic B.

In the fifth embodiment, the transient characteristic is repeatedly produced and positively utilized. More particularly, when the engine operating condition detected by the engine operating condition detecting means 3B is determined to be in an idling or deceleration condition by the determining means 4B, the lean NOx catalyst 2B is cooled by the cooling means 5B, for example, by secondary air introduced into the exhaust gas. The reason why the cooling is not executed in other conditions than idling or deceleration condition is that the exhaust gas amount and temperature are great in an acceleration condition and therefore, an effective cooling will not be obtained.

Since an actual vehicle running condition includes repetition of idling, deceleration and acceleration, the cycle of cooling and then stopping the cooling is repeatedly executed. As a result, a great improvement of NOx reduction rate can be seen.

Figure 19:
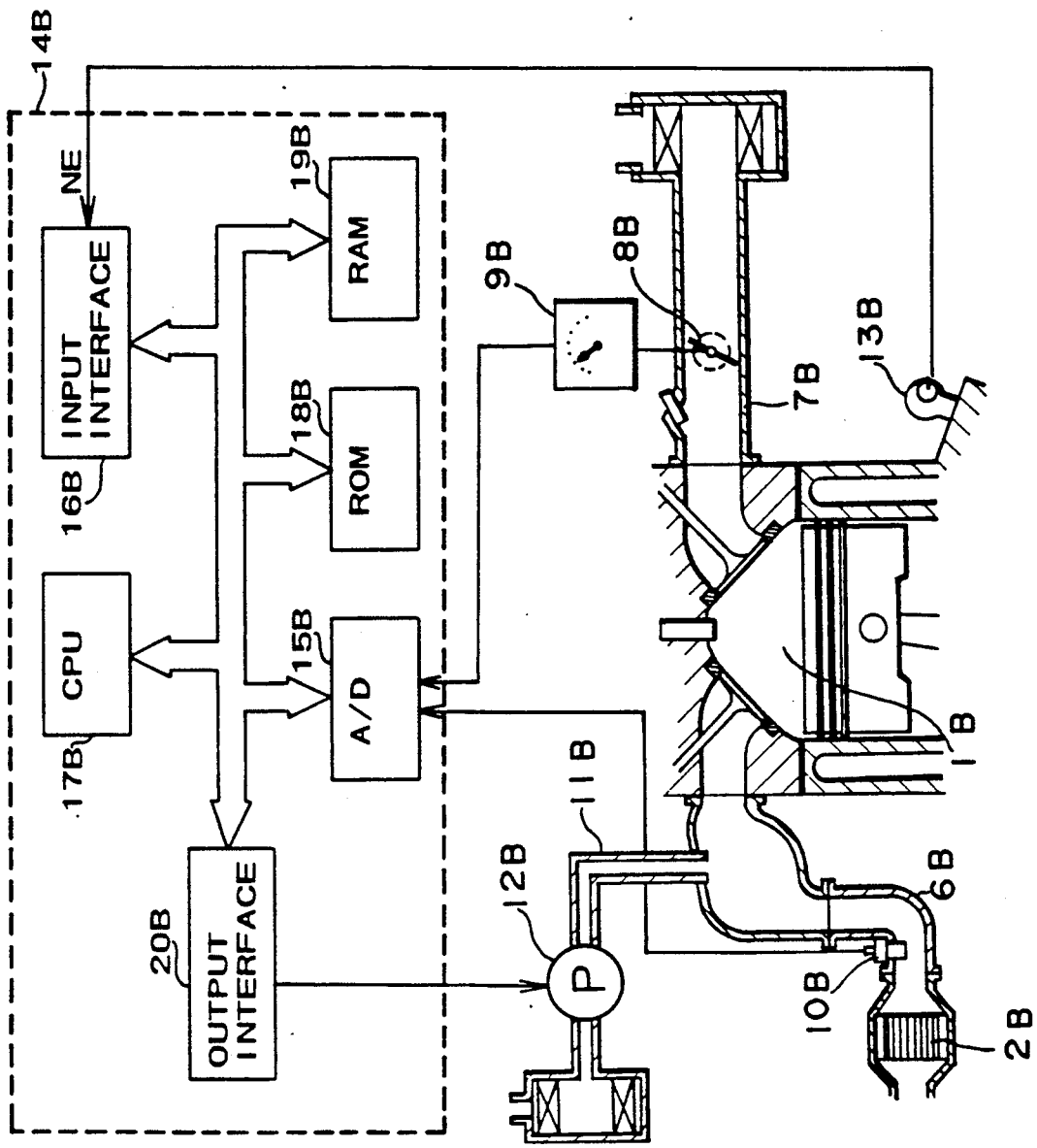
FIG. 19 is a detailed system diagram of the fifth embodiment of the present invention.

FIG. 19 illustrates in more detail a system of the fifth embodiment. In an exhaust conduit 6B of the engine 1B, the lean NOx catalyst 2B is installed. In an intake conduit 7B of the engine 1B, a throttle valve 8 is installed, and a throttle sensor 9B for detecting a throttle opening degree of the valve 8 is coupled to the throttle valve 8. Since the closed condition of the throttle valve 8 may be deemed an idling or deceleration condition, the throttle opening degree signal constitutes a signal for detecting the idling or deceleration condition. Also, an exhaust gas temperature sensor 10B is installed in the exhaust conduit 6B. The throttle sensor 9B and the exhaust gas sensor 10B constitute the engine operating condition detecting means 3B of FIG. 18.

A secondary air supply device 11B for introducing secondary air into the exhaust gas to cool the lean NOx catalyst 2B is installed in the exhaust conduit 6B. The device 11B includes an air pump 12B. By controlling the operating period of time of the air pump 12B, the cooling period of time of the lean NOx catalyst 2B can be controlled. The secondary air supply device 11B including the air pump 12B constitutes one portion of the cooling means 5B of FIG. 18.

The supply of secondary air is controlled by an engine control computer (hereinafter, ECU) 14B of FIG. 19. ECU 14B includes an A/D converter 15b for converting the analog signals from the throttle sensor 9B and the exhaust gas temperature sensor 10B to digital signals, an input interface 16B for receiving a digital signal from a crank angle sensor 13B, a CPU 17B for executing calculations in accordance with a flow chart of FIG. 20, a ROM 18B for storing the program of FIG. 20 and a map of FIG. 21, a RAM 19B, and an output interface 20B.

Figures 20, 21:
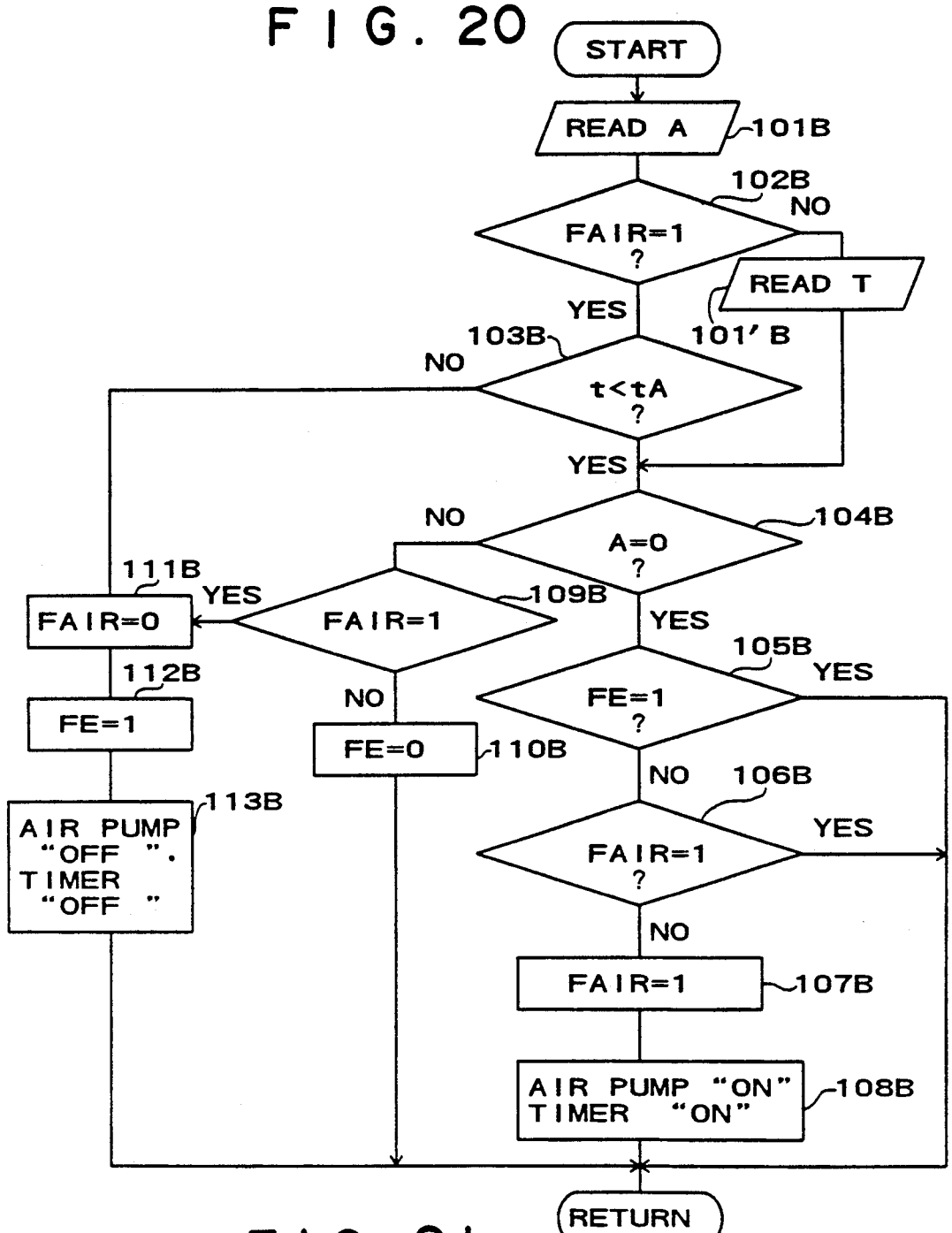
FIG. 20 is a control flow chart of the fifth embodiment of the present invention.
FIG. 21 is a map illustrating a relationship between exhaust gas temperature and period of time of air pump operation.

FIG. 20 illustrates a routine for controlling the secondary air introduction into the exhaust gas. FIG. 21 is a map illustrating a relationship between the exhaust gas temperature T and a pump operating period of time tA, which is used in the calculation of FIG. 20. In FIG. 20, a reference A illustrates a throttle opening degree, and the condition of "A=0" corresponds to an idling or deceleration condition. Also, in FIG. 20, a reference t illustrates a timer counting time, a flag FAIR illustrates operation of the air pump, and a flag FE illustrates an air pump operation finish. More particularly, "1" and "0" of the flag FAIR correspond to "operation" and "stop operation" of the air pump, respectively, and "1" and "0" of the flag FE correspond to "operation finish" and "during operation" of the air pump, respectively.

At every predetermined crank angle, the routine of FIG. 20 is entered. At step 101B, the throttle opening degree A is read. At the next step 102B, whether flag FAIR is at "1" or not is determined. When the engine operating condition changes to an idle or deceleration condition, since flag FAIR was set to "0" in the previous cycle of calculation, the routine proceeds from step 102B to a step 101'B. At step 101'B, the exhaust gas temperature T is read, and then the routine proceeds to 104B. At step 104B, whether or not flag A is "0" that is whether or not the throttle valve is closed is determined. In this instance, the step 104B constitutes the determining means 4B of FIG. 18. When the engine operating condition changes to an idling or deceleration condition, since A was set to "0" at step 101B, reference A is determined to be "0" at step 104B, and the routine proceeds to a step 105B. Since the flag FE was set to "0" in the previous cycle of calculation, the flag FE is determined to be "0" at step 105B, and the routine proceeds to a step 106B. At step 106B, flag FAIR is determined to be "0" and the routine proceeds to a step 107B, where the flag FAIR is set to "1". Then, the routine proceeds to a step 108B, where the air pump 12 is switched on and the timer also is switched on. Due to the control through these steps, when the engine is in an idling or deceleration condition, the air pump 12B begins to operate to cool the lean NOx catalyst 2B, and the timer begins to count. In this instance, the step 108B constitutes one portion of the cooling means 5B of FIG. 18.

At the next cycle of calculation, when the routine proceeds to step 102B, flag FAIR is determined to be "1" because the flag FAIR was set to "1" at the previous cycle of calculation. Then, the routine proceeds to a step 103B, where it is determined whether or not the timer counting time t has reached a predetermined air pump operating period of time tA, which is determined with respect to the exhaust gas temperature T as shown in FIG. 21. When the period of time t is smaller than the predetermined value tA, the routine proceeds to 104B, 105B, and then 106B. At step 106B, flag FAIR is determined to be "1" because the flag FAIR was set "1" at the previous cycle of calculation. Therefore, the routine bypasses the steps 107B and 108B and proceeds to the final step where the routine returns to another routine. As a result, the air pump 12B and the timer are maintained "ON", and the cooling is continued.

When the timer operating period of time t finally reaches the predetermined value tA, the routine proceeds from step 103B to a step 111B. At step 111B, flag FAIR is set to "0" and then at step 112B, flag FE is set to "1". Then, the routine proceeds to a step 113B, where the air pump 12B is switched off and the timer also is switched off to be cleared. Due to this, the period of time of the cooling is restricted to the period of time tA.

After the air pump operation finishes, that is, after the flag FE was set to "1" at step 112B at the previous cycle of operation, if the idling or deceleration condition is continued, the routine proceeds through steps 102B, 103B, and 105B to step 105B at the current cycle of calculation. Since flag FE is determined to be "1" at step 105B, the routine proceeds to the final step where the routine returns to another routine. As a result, the air pump and the timer set at step 113B in the previous cycle of calculation are maintained "OFF".

The engine operating condition will change from the idling or deceleration condition to another condition, for example an acceleration condition. Under the acceleration condition, at step 101B, A is read. When the routine proceeds to step 102B, the flag FAIR is determined to be "0" because FAIR was set to "0" in the previous cycle of calculation, and the routine proceeds through a step 101'B to step 104B. Since the throttle opening degree flag A is determined not to be "0" at step 104B, the routine proceeds to step 109B. Since flag FAIR was set to "0" in the previous cycle, the routine proceeds to step 110B where flag FE is set to "0" and then the routine returns Because this route bypasses the step 108B, the air pump 12B is not switched on.

When an acceleration condition begins before a period of time tA has elapsed after start of the air pump Operation, flag FAIR is determined to be "1" at step 109B. At that time, the routine proceeds from step 109B to step 11B, and then through step 112B to the step 113B where the air pump 12B and the timer are switched off and the cooling of the lean NOx catalyst 2B is stopped at once.

The operation of the fifth embodiment will now be explained. When the engine operating condition changes to an idling or deceleration condition, the air pump 12B is operated to begin cooling of the lean NOx catalyst 2B. The cooling is continued until the engine operating condition changes to another condition or until the predetermined period of time tA of FIG. 21 has elapsed. The period of time tA is determined so as to cool the lean NOx catalyst to a temperature at which the highest NOx purification rate is obtained. More particularly, it is preferable to cool the lean NOx catalyst to about 300° C. If the catalyst was cooled to 200° C. or 400° C., the highest purification would not be obtained.

Figure 16:
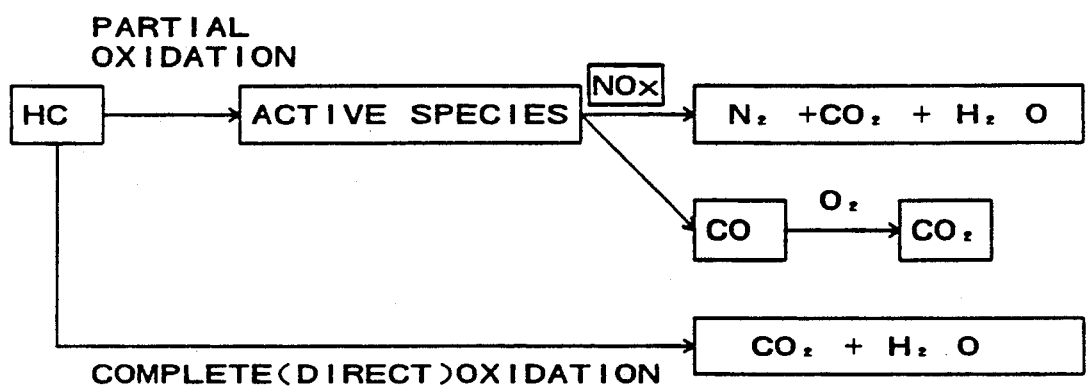
FIG. 16 is a block diagram illustrating a NOx reduction mechanism of a lean NOx catalyst.
Figure 17:
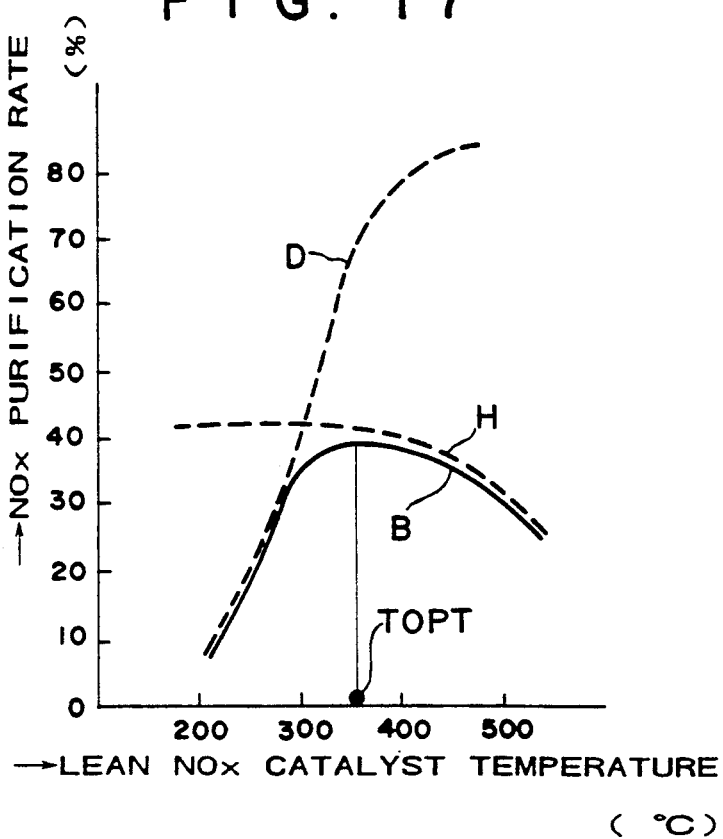
FIG. 17 is a diagram illustrating a relationship between lean NOx catalyst temperature and NOx purification rate.

When the lean NOx catalyst 2B is cooled, the direct oxidation of FIG. 16 is suppressed and the partial oxidation is promoted. As a result, the amount of active species produced at the lean NOx catalyst 2B increases and the produced active species is stored in the cells of the lean NOx catalyst 2B. During the cooling, reaction between the active species and NOx is regulated by characteristic D of FIG. 24, and therefore improvement of NOx reduction can not be seen. However, after the cooling is stopped, the temperature of the catalyst gradually increases as it is exposed to the exhaust gas of high temperatures, and the NOx reduction rate is greatly improved at relatively high temperatures as shown by characteristic C of FIG. 24. This increase in the NOx reduction rate continues for a few minutes, and then the characteristic returns to characteristic B of FIG. 24.

In accordance with the fifth embodiment, since the cycle of cooling and temperature rising of the catalyst is repeated, the NOx purification rate is greatly improved as a whole. Further, since the lean NOx catalyst 2B is repeatedly cooled, attachment of coke to the lean NOx catalyst 2B is suppressed, and the durability of the lean NOx catalyst 2B is improved.

SIXTH AND SEVENTH EMBODIMENTS

An exhaust gas purification system for an internal combustion engine in accordance with any one of the sixth and seventh embodiments generally includes an internal combustion engine capable of executing fuel combustion at lean air-fuel ratios, a lean NOx catalyst which is divided or sectioned into a plurality of portions arranged in parallel with each other, and means for repeatedly producing a catalyst temperature rising condition by alternately cooling the catalyst portions when the temperature of the lean NOx catalyst is relatively high.

Figure 25:
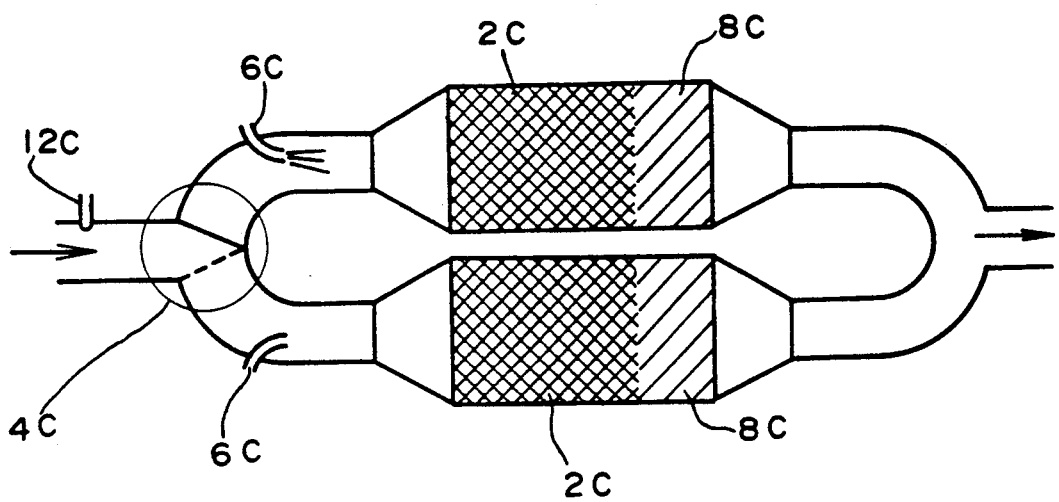
FIG. 25 is a schematic system diagram illustrating an exhaust gas purification system for an internal combustion engine in accordance with a sixth embodiment of the present invention.
Figure 26:
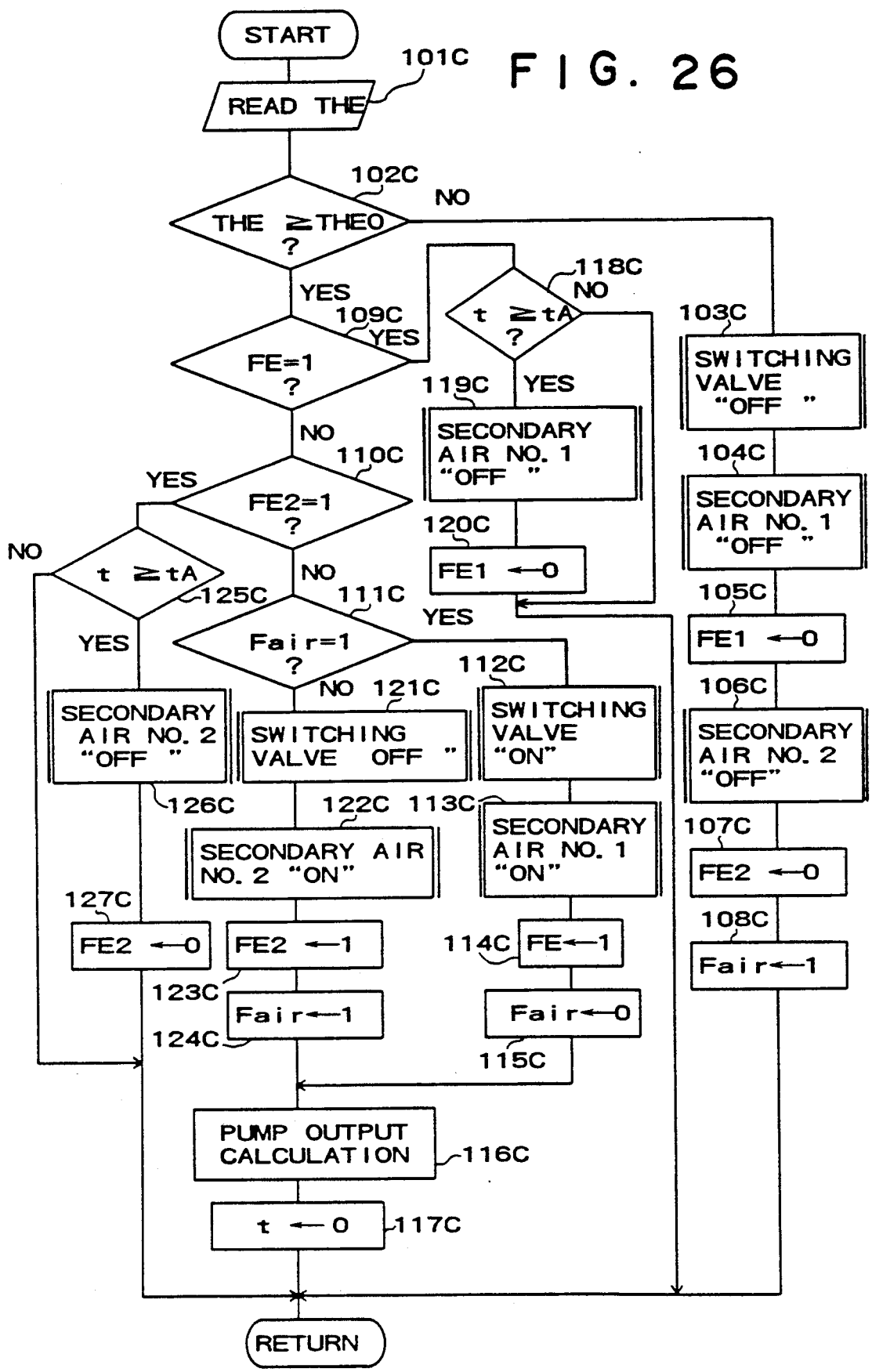
FIG. 26 is a control flow chart of the sixth embodiment of the present invention.
Figure 27:
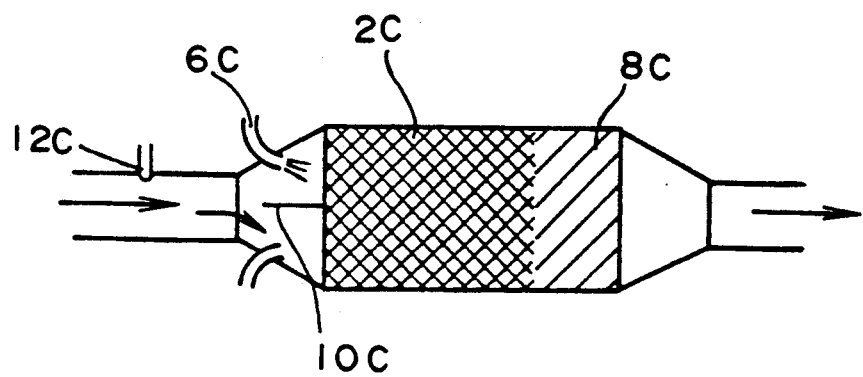
FIG. 27 is a schematic system diagram illustrating an exhaust gas purification system for an internal combustion engine in accordance with a seventh embodiment of the present invention.
Figure 28:
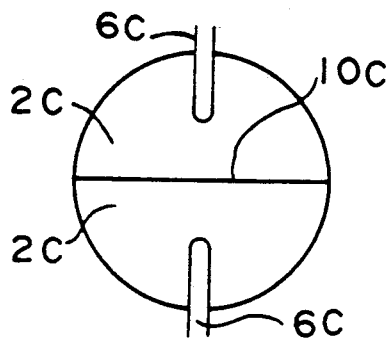
FIG. 28 is a schematic cross-sectional view of a lean NOx catalyst with two sections, of the seventh embodiment.
Figure 29:
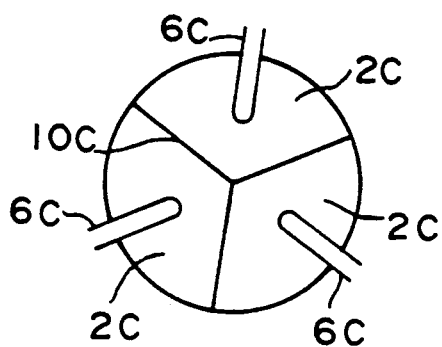
FIG. 29 is a schematic cross-sectional view of a lean NOx catalyst with three sections, of the seventh embodiment.
Figure 30:
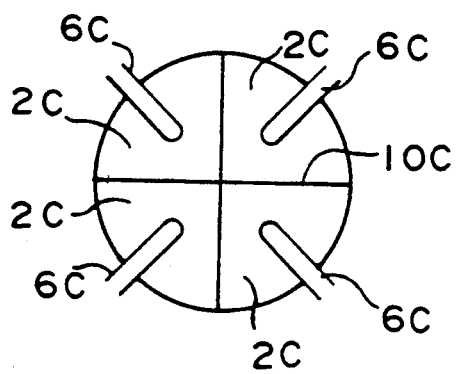
FIG. 30 is a schematic cross-sectional view of a lean NOx catalyst with four sections, of the seventh embodiment.
Figure 31:
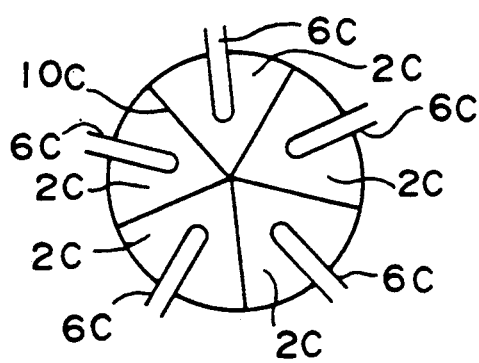
FIG. 31 is a schematic cross-sectional view of a lean NOx catalyst with five sections, of the seventh embodiment.

More particularly, FIGS. 25 and 26 illustrate the sixth embodiment. As illustrated in FIG. 25, a plurality of catalytic converter cases are arranged in parallel with each other. A catalyst portion 2C is housed in each catalytic converter case. A plurality of branch conduits each connected to each catalytic converter case join each other at a connecting portion where a switching valve 4C is installed so as to selectively direct the exhaust gas flow to any one of the branch conduits. A plurality of secondary air inlets 6C are provided, and each secondary air inlet is provided in a portion of each branch conduit upstream of the catalyst portion 2C. A secondary air inlet 6C introduces secondary air into one branch conduit when the branch conduit is closed by the switching valve 4C. In the exhaust conduit portion upstream of the switching valve 4C, an exhaust gas temperature sensor 12C is provided. On a downstream side of each lean NOx catalyst 2C, a three-way catalyst 8C may be provided.

FIG. 26 illustrates the control of secondary air supply. Secondary air No. I in FIG. 26 corresponds to secondary air introduced into a first branch conduit of FIG. 25 and secondary air No. 2 in FIG. 26 corresponds to secondary air introduced into a second branch conduit of FIG. 25. Further, switching valve 4C "ON" corresponds to a first position of the valve 4C shown by a full line in FIG. 25, and switching valve 4C "OFF" corresponds to a second position of the valve 4C shown by a broken line in FIG. 25.

In FIG. 26, at step 101C the exhaust gas temperature THE is read. Then, at the next step 102C, whether or not the exhaust gas temperature is low is determined. When THE is lower than a predetermined temperature THE0 (for example, 300° C.), secondary air is not need. Therefore, the routine proceeds to steps 103C through 108C. At step 103C, the switching valve 4C is switched off so that the exhaust gas flows through the catalyst No. 1. Then, at step 104, supply of secondary air No. 1 is stopped, and at step 105C, a flag FE1 which defines supply or non-supply of secondary air No. 1 is set to "0". Similarly, at step 106C, supply of the secondary air No. 2 is stopped, and at step 107C, a flag FE2 which defines supply or non-supply of secondary air No. 2 is set to "0". Then, at step 108C, flag Fair which defines supply or non-supply of secondary air at the next cycle is set to "1" which indicates that the secondary air to be injected in the next cycle is secondary air No. 1.

When THE exceeds THE0 for the first time at step 102C, the routine proceeds from step 102X to a step 109C. Then, the routine further proceeds through steps 110C and 111C to a step 112C, because the flag FE1 was set to "0" at step 105C, the flag FE2 was set to "0" at step 107C, and the flag Fair was set to "1" at step 108C in the previous cycle of calculation. At step 112C, the catalyst No. 1 is cooled and the switching valve 4C switched to cause the exhaust gas to flow through the catalyst No. 2. Then, at step 113C, the secondary air No. 1 is introduced, and at steps 114C and 115C, flag FE1 is set to "1" and flag Fair is set to "0". Then, the routine proceeds to a step 116C, where a pump output is determined in correspondence to the exhaust gas temperature THE, and at step 117C the timer is cleared.

In the next cycle of calculation, the routine proceeds from step 109C to a step 118C because flag FE1 was set to "1" at step 114C in the previous cycle of calculation. At step 118C, whether or not the timer counting time t reaches or exceeds a predetermined value tA is determined. When t is smaller than tA at step 118C, the current condition is maintained and the routine proceeds to the final, returning step. When t reaches or exceeds tA at step 118C, the routine proceeds to a step 119C, where introduction of secondary air No. 1 is stopped. Then, at the next step 120C, flag FE1 is set to "0".

In the next cycle of calculation, the routine proceeds from step 111C to a step 121C, because flag Fair was set to "0" at step 115C in the previous cycle of calculation. At step 121C, the switching valve 4C is switched off to cause the exhaust gas to flow through the catalyst No. 1, and then at step 122C, supply of secondary air No. 2 is switched to "ON". Then, at step 123C, flag FE2 is set to "1" and at step 124C, flag Fair is set to "1"

In the next cycle of calculation, the routine proceeds from step 110C to a step 125C, because flag FE2 was set to "1" at step 123C in the previous cycle of calculation. At step 125C, until the timer counting time t reaches tA, the routine proceeds to the final, returning step, and when t reaches or exceeds tA, supply of secondary air No 2 is switched to "OFF" and at the next step 127C, flag FE2 is set to "0".

In this way, catalyst No. 1 and catalyst No. 2 are alternately cooled by secondary air at intervals tA, The secondary air inlets 6C, the secondary air injected through the inlets, and the program steps for alternating injection of the secondary air constitute means which alternately switches the switching valve 4C between the plurality of branch conduits when the exhaust gas temperature is high.

FIGS. 27 through 32 illustrate the seventh embodiment of the invention. In the seventh embodiment, some elements have the same structures as those of the sixth embodiment, and explanation about the elements with the same structures will be omitted by denoting the elements with like reference numerals.

The portions in which the seventh embodiment differs from the sixth embodiment are as follows: The system according to the seventh embodiment includes a single catalytic converter case. The lean NOx catalyst 2C is installed in an intermediate portion of the catalytic converter case. A dividing wall 10C is provided so as to divide an upstream portion of the interior of the catalytic converter case into a plurality of sections so that the sections are in parallel with each other. The dividing wall 10C will section the catalyst because the catalyst is constructed of a monolithic catalyst having axially extending independent cells parallel to each other. A secondary air inlet 6C is provided for each section, but a switching valve corresponding to the valve 4C of the sixth embodiment is not provided. When secondary air is introduced into any one section, the portion of the catalyst located downstream of the one section is cooled. The number of the sections are equal to or greater than two. FIGS. 28 through 31 illustrate the cases where the number of the sections are two, three, four, and five, respectively. The means for repeatedly producing a catalyst temperature rising condition includes means which alternately introduces secondary air through the secondary air inlet 6C when the exhaust gas temperature is high.

FIG. 32 illustrates a control flow chart for the seventh embodiment which is the same as that of the sixth embodiment except that the steps 103C, 112C and 121C relating to the switching valve, of the sixth embodiment are deleted from the flow chart of the seventh embodiment. Therefore, explanation about the steps of the seventh embodiment will be omitted by denoting the like steps with like reference numerals.

The operation of the sixth and seventh embodiments will now be explained.

When the exhaust gas temperature is low, direct oxidation of hydrocarbon to carbon dioxide and water is not promoted. Therefore, the lean NOx catalyst 2C is not needed to be cooled, and the secondary air for cooling the catalyst is not supplied.

Figure 33:
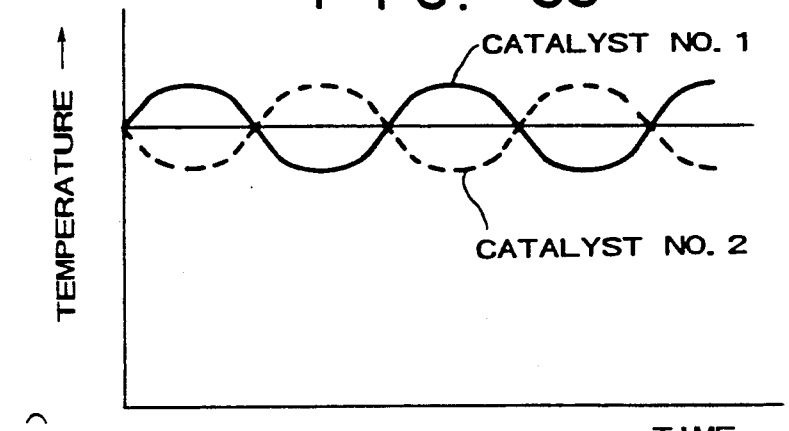
FIG. 33 is a graph illustrating a temperature variation of a lean NOx catalyst.
Figure 34:
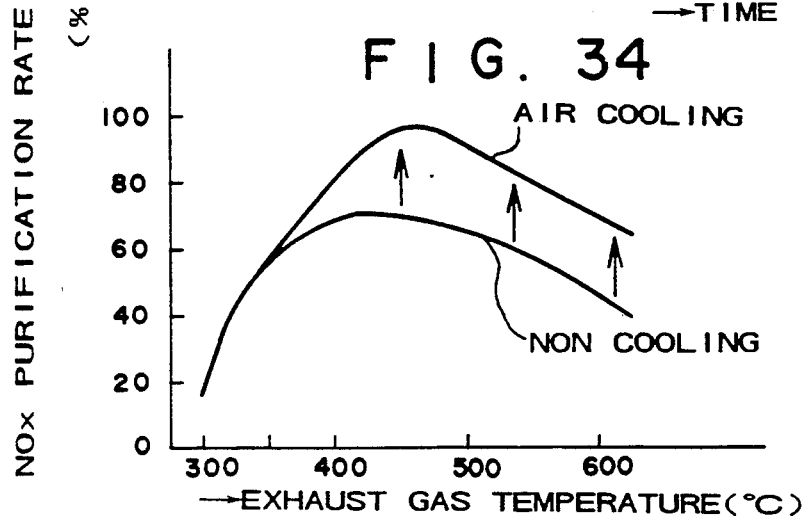
FIG. 34 is a graph illustrating a difference in NOx purifacation rate between a case where the catalyst is cooled and a case where the catalyst is not cooled.

When the exhaust gas temperature high, the secondary air is alternately supplied and the sections of the lean NOx catalyst are alternately cooled. Due to this alternate cooling, direct oxidation of hydrocarbon in the catalyst section being cooled is suppressed and partial oxidation of hydrocarbon is promoted to produce a great amount of active species in the catalyst section during cooling. When the cooling is switched to another catalyst section, the catalyst section which has been cooled is exposed to the exhaust gas at high temperatures and shows a high NOx reduction rate at least for a few minutes. Since a cycle of cooling and allowing a temperature rise is repeated as shown in FIG. 33, the overall NOx purification rate of the lean NOx catalyst 2C is greatly improved as shown in FIG. 34.

In accordance with any one of the sixth and seventh embodiments, the following effects are obtained.

First, since the lean NOx catalyst sections are alternately cooled when the exhaust gas temperature is high, the NOx purification rate is greatly increased.

Second, since the lean NOx catalyst is repeatedly cooled, the durability of the catalyst will be improved.

Third, since carbon deposited onto the lean NOx catalyst is burned when the secondary air is supplied, decrease of NOx reduction ability of the catalyst due to carbon deposits will be prevented.

EIGHTH EMBODIMENT

Figure 35:
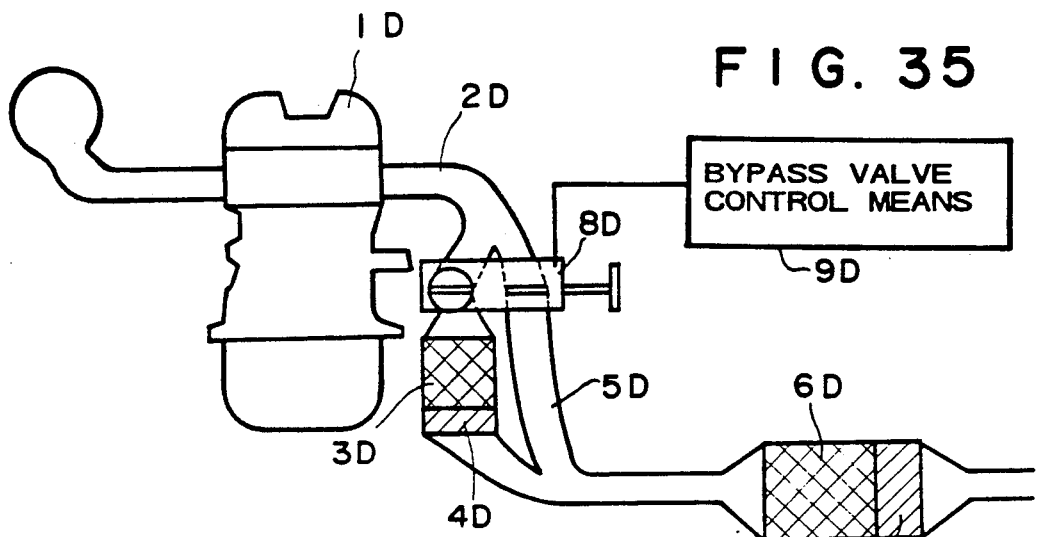
FIG. 35 is a schematic system diagram for an internal combustion engine in accordance with an eighth embodiment of the present invention.

As illustrated in FIG. 35, an exhaust gas purification system for an internal combustion engine in accordance with the eighth embodiment includes an internal combustion engine 1D capable of executing fuel combustion at lean air-fuel ratios, a lean NOx catalyst 3D installed in an exhaust conduit 2D of the engine, which is divided into a first portion 3D (a first lean NOx catalyst) and a second portion 6D (a second lean NOx catalyst) arranged in series with each other, a bypass conduit 5D bypassing the first lean NOx catalyst 3D, a bypass valve 8D adapted to switch the exhaust gas flow between the first lean NOx catalyst 3D and the bypass conduit 5D, and a means, in the form of bypass valve control means 90, for repeatedly producing a catalyst temperature rising condition by repeatedly executing a cycle of cooling the first lean NOx catalyst 3D and then stopping the cooling to allow the first lean NOx catalyst 3D to rise in temperature. More particularly, the catalyst temperature rising condition repeatedly producing means includes means which alternately switches the bypass valve 8D when the exhaust gas temperature is high.

When the exhaust gas temperature is low, the exhaust gas is caused to flow through the first lean NOx catalyst 3D, and NOx is reduced by the first lean NOx catalyst 3D. Before the exhaust gas that has passed through the first lean NOx catalyst 3D reaches the second lean NOx catalyst 6D, the exhaust gas temperature lowers to a temperature at which the second lean NOx catalyst 6D cannot show a sufficient activity for NOx reduction.

On the other hand, when the exhaust gas temperature is high, the bypass valve 8D is alternately switched at intervals, and therefore, the exhaust gas flows alternately through the first lean NOx catalyst 3D and through the bypass conduit 5D. When the exhaust gas flows through the bypass conduit 5D, the exhaust gas temperature lowers to an appropriate temperature due to natural heat release before the gas reaches the second lean NOx catalyst 6D. As a result, partial oxidation of hydrocarbon is promoted at the second lean NOx catalyst 6D and NOx is purified at the second lean NOx catalyst 6D. When the exhaust gas flows through the bypass conduit 5D, the temperature of the first lean NOx catalyst 3D gradually decreases due to natural heat release. Then, the bypass valve 8D is switched to cause the exhaust gas to flow through the first lean NOx catalyst 3D. Since the first lean NOx catalyst 3D has been cooled to an appropriate temperature, the first lean NOx catalyst 3D can show a high NOx reduction ability before it is heated to a high temperature. When the first lean NOx catalyst 3D rises to a high temperature, the bypass valve 8D switches so that the exhaust gas flows through the bypass conduit 5D. The above-described switching is repeated to obtain a high NOx reduction rate over a wide range of exhaust gas temperature.

Figure 36:
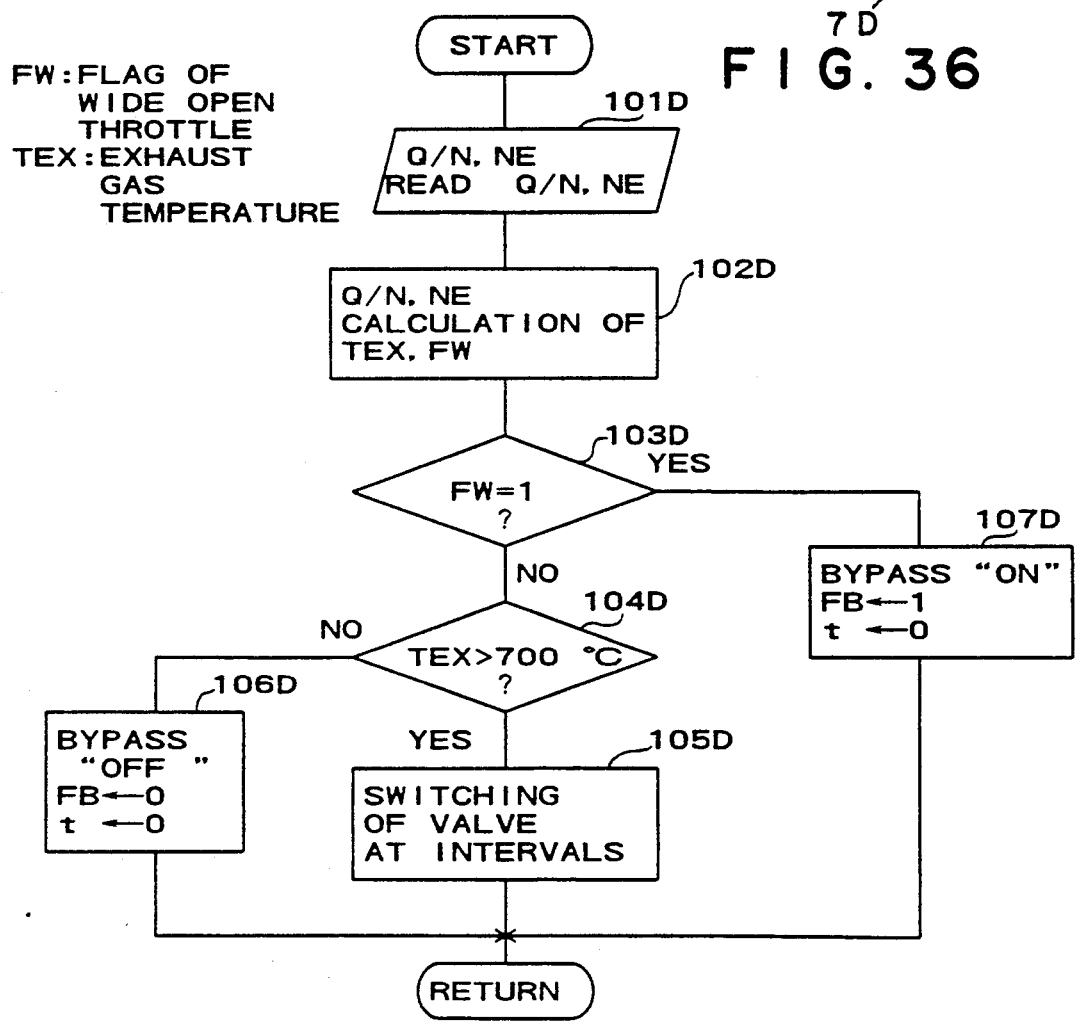
FIG. 36 is a control flow chart of the eighth embodiment of the present invention.
Figure 37:
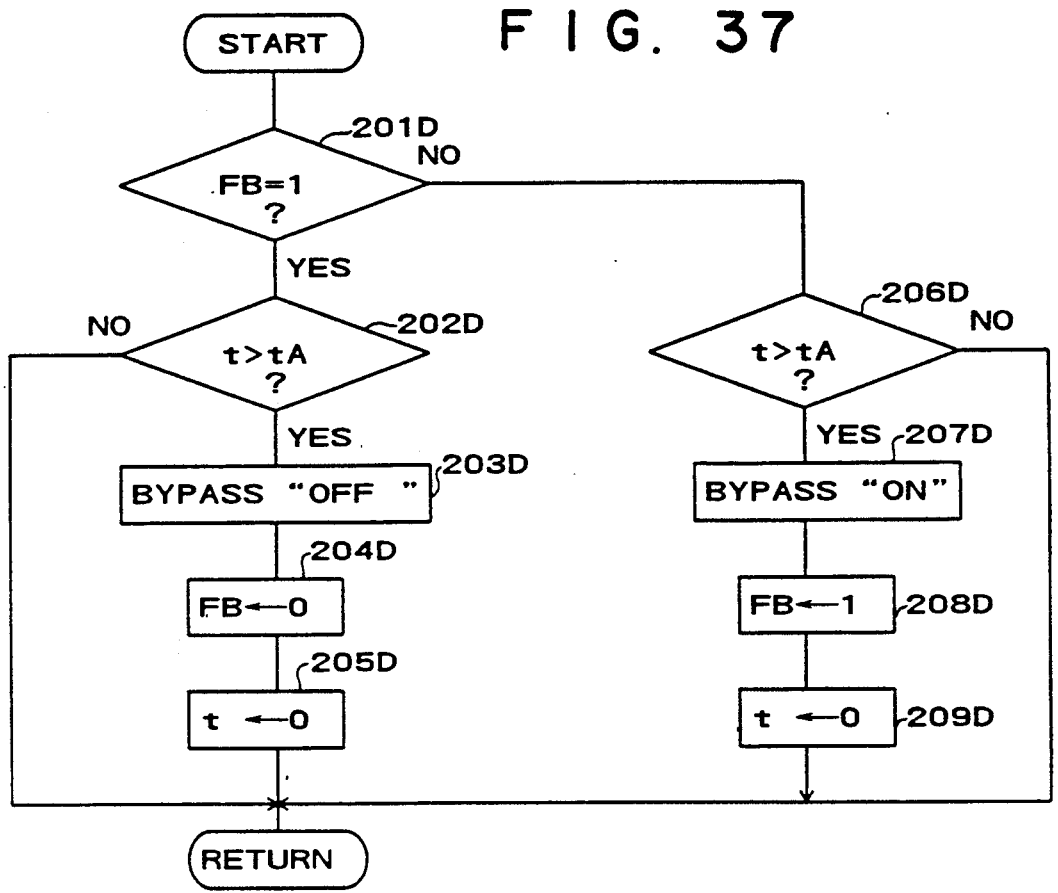
FIG. 37 is a flow chart of a sub-routine needed in the calculation according to the routine of FIG. 36.
Figure 38:
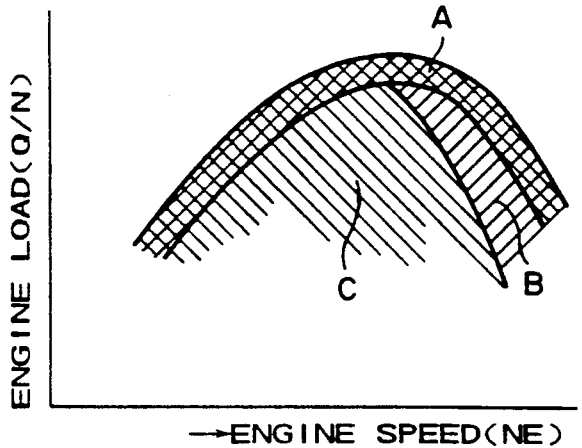
FIG. 38 is a map illustrating a relationship between exhaust gas temperature and engine speed/engine load.

The bypass valve control means 9D includes a CPU, a ROM, a RAM, and input/output interfaces. An engine load sensor signal Q/N and an engine speed sensor signal NE are fed to the computer and are stored in the RAM. The ROM stores the bypass valve switching control program, and a sub-routine and map for the program, as shown in FIGS. 36, 37 and 38. The CPU calls out these programs from the ROM and executes the calculation.

In FIG. 36, inputs of the engine load Q/N and engine speed NE are read at step 101D. Then, at step 102D, an exhaust gas temperature (or a lean NOx catalyst temperature) TEX and WOT (wide open throttle) flag FW are calculated from the inputs Q/N and NE using the map of FIG. 38. In this instance, the exhaust gas temperature may be directly measured using a temperature sensor. Also, "1" of the FW flag means that the engine operating condition exists in region A of FIG. 38 and therefore that the current condition is in a range of rich air-fuel ratios, and "0" of the FW flag means that the engine operating condition exists in region B or C or FIG. 38 and therefore that the current condition is in a range of lean air-fuel ratios. Further, region B corresponds to a high temperature range and region C corresponds to a low temperature range.

Then, the routine proceeds to a step 103D, where whether or not the WOT flag FW is "1" is determined, that is, whether or not the current engine operating condition is in a high power air-fuel ratio range is determined. When FW is "1" at step 103D, the fuel-air ratio is rich and therefore, NOx reduction by the lean NOx catalyst cannot be expected even if the exhaust gas flows through the catalyst. Therefore, in order to prevent degradation of the lean NOx catalyst due to high temperatures, the routine proceeds to a step 107D, where the bypass valve 8D is switched to cause the exhaust gas to flow through the bypass conduit 5D, and further, a bypass flag FB is reset and a timer counting time t is set to 0. In this state, the exhaust gas flows through the bypass conduit 5D to the second lean NOx catalyst 6D. The exhaust gas is purified by the second lean NOx catalyst 6D and then by a three-way catalyst 7D provided downstream of the second lean NOx catalyst 6D.

When FW is determined to be "0" at step 103D, the engine operating condition is in a lean air-fuel ratio range, the routine proceeds to a step 104D, where whether or not the exhaust gas temperature TEX is higher than a predetermined temperature, for example 700° C. is determined When TEX is determined to be equal to or lower than 700° C., the lean NOx catalyst temperature is deemed to be at temperatures where a great amount of active species can be produced, and the routine proceeds to a step 106D. At step 106D, the bypass valve 8D is switched to cause the exhaust gas to flow through the first lean NOx catalyst 3D, and further the bypass flag FB is set and the counter is reset. In this state, the exhaust gas flows through the first lean NOx catalyst 3D where a great amount of active species is produced.

When the exhaust gas temperature TEX is greater than 700° C. at step 104D, the routine proceeds to a step 105D to prevent thermal degradation of the catalyst, because the first lean NOx catalyst 3D cannot reduce NOx above 700° C. At step 105D, the bypass valve 8D is alternately switched.

FIG. 37 illustrates a sub-routine for alternately switching the bypass valve 8D. At step 201D, whether or not the bypass flag FB is "1" is determined. In this instance, "1" of flag FB means that the exhaust gas flows through the bypass conduit 5D, and "0" of flag FB means that the exhaust gas flows through the first lean NOx catalyst 3D.

When bypass flag FB is determined to be "1" at step 201D, the routine proceeds to a step 202D, where whether or not the timer counting time t exceeds a predetermined value tA is determined. When t is determined to exceed tA at step 202D, the routine proceeds to a step 203D where bypass valve 8D is switched to cause the exhaust gas to flow through the first lean NOx catalyst 3D. Then, at step 204D, flag FB is set to "0" and at step 205D, the timer count is cleared.

When the flag FB is determined to be "0" at step 201D, the routine proceeds to a step 206D, where whether or not the timer counting time t exceeds the predetermined value tA is determined. When t is determined to exceed tA at step 206D, the routine proceeds to a step 207D, where the bypass valve 8D is switched to cause the exhaust gas to flow through the bypass conduit 5D. Then, at step 208D, the bypass flag FB is set to "1" and at step 209D, the timer is cleared. In this way, the bypass valve 8D is alternately switched.

The operation of the eighth embodiment will now be explained. When the exhaust gas temperature is low, the bypass valve 8D is switched to the first lean NOx catalyst side. In this state, the temperature of the first lean NOx catalyst 3D is at a temperature between 300° C. and 500° C., and the first lean NOx catalyst 3D can show a high Nox reduction rate so that most of NOx is purified by the first lean NOx catalyst 3D.

The condition of high exhaust gas temperature is separated into a first case of high power air-fuel ratios and a second case of low power air-fuel ratios.

When the exhaust gas temperature is high and the fuel-air ratio is not at high power fuel-air ratios, the bypass valve 8D is alternately switched in accordance with the sub-routine of FIG. 37. When the exhaust gas flows through the first lean NOx catalyst 3D, the temperature of the first lean NOx catalyst rises, and when the exhaust gas flows through the bypass conduit 5D, the temperature of first lean NOx catalyst 3D falls due to natural heat release. The NOx reduction rate of the lean NOx catalyst in the temperature rising course is greater than that in the temperature lowering course as discussed with reference to FIG. 10. Since the bypass valve 8D is alternately switched, the temperature rising courses are positively and repeatedly produced in the first lean NOx catalyst 3D to greatly improve the NOx reduction rate of the catalyst.

When the exhaust gas temperature is high and the air-fuel ratio is at high power air-fuel ratios, the first lean NOx catalyst 3D has no longer a NOx reduction ability, because the lean NOx catalyst can show a NOx reduction characteristic only at lean air-fuel ratios. In this state, the bypass valve 8D is switched to cause the exhaust gas to flow through the bypass conduit 5D to the second lean NOx catalyst 6D and the three-way catalyst 7D. Before the exhaust gas reaches the second lean NOx catalyst 6D, the exhaust gas temperature falls to an appropriate temperature. Therefore, the exhaust gas is effectively purified by the second lean NOx catalyst 6D.

In accordance with the eighth embodiment, since the temperature rising courses of the first lean NOx catalyst 3D is positively produced, the NOx purification rate is improved.

NINTH EMBODIMENT

As shown in FIG. 40, an exhaust gas purification system for an internal combustion engine in accordance with the ninth embodiment of the invention includes an internal combustion engine 1E capable of executing fuel combustion at lean air-fuel ratios, a lean NOx catalyst 2E located at a position of an exhaust conduit of the engine where the temperature of the lean NOx catalyst 2E rises above the temperature range ($T_1 - T_2$ of FIG. 39) which enables the catalyst to show a high NOx reduction rate under a normal engine operating condition, cooling means for cooling the lean NOx catalyst (for example, secondary air inlet means 3E), catalyst temperature detecting means 4E for detecting the temperature of the lean NOx catalyst 2E, and means for repeatedly producing a catalyst temperature rising condition. More particularly, the means for repeatedly producing a catalyst temperature rising condition includes means 6E which begins cooling of the catalyst 2E by operating the cooling means 3E when the catalyst temperature rises above the temperature $T_2$ and stops the cooling when the catalyst temperature lowers below the temperature $T_1$.

The mean 6E is constituted by an engine control computer which stores a program of FIG. 41, and a CPU of the computer executes calculations in accordance with the program.

In FIG. 41, the catalyst temperature TEX is read at step 101E. At the next step 102E, whether or not TEX is equal to or greater than $T_2$ is determined. When TEX is equal to or greater than $T_2$, the routine proceeds to a step 105E, where secondary air is supplied through the secondary air inlet 3E. Then, at step 106E, a secondary air supply flag F is set to "1". When TEX is lower than $T_2$ at step 102E, the routine proceeds to a step 103E, where whether or not the flag F is "0" is determined, that is, whether the temperature is in a rising course or in a falling course is determined When F is "1" the temperature is determined to be in a falling course, because TEX previously exceeded $T_2$, and flag F was set to "1" at step 106E. The cooling is continued until TEX reaches $T_1$. When TEX falls below T1, the routine proceeds to a step 107E, where supply of the secondary air is stopped, and at step 108E, flag F is set to "0". When flag F is determined to be "0", the temperature is in a rising course from engine start, the stopping of the supply of secondary air is continued to cause the catalyst to swiftly rise in temperature.

In accordance with the ninth embodiment, the lean NOx catalyst temperature is controlled to a temperature range between $T_1$ and $T_2$, and a cycle of cooling and temperature rising is repeatedly afforded to the lean NOx catalyst. As a result, the NOx purification rate of the lean NOx catalyst is greatly improved.

TENTH EMBODIMENT

Figure 42:
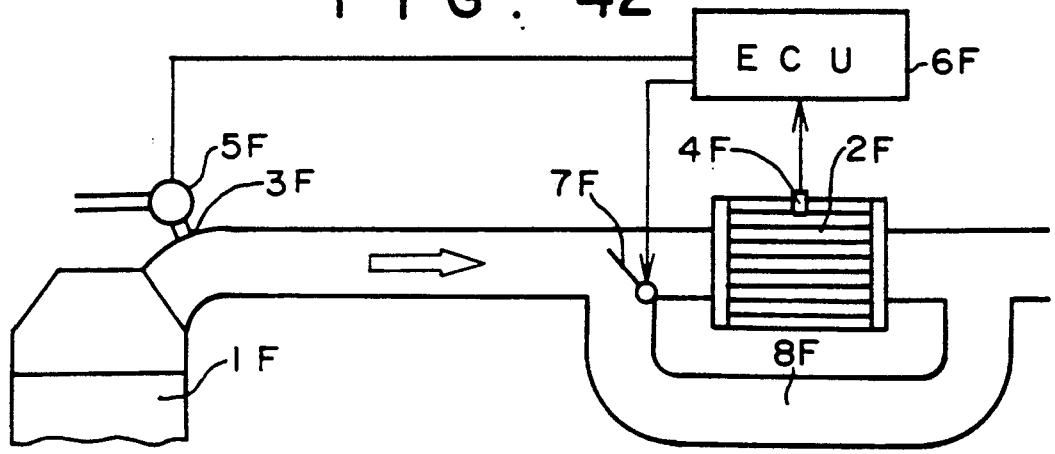
FIG. 42 is a schematic system diagram of an exhaust gas purification system for an internal combustion engine in accordance with a tenth embodiment of the present invention.

As shown in FIG. 42, an exhaust gas purification system for an internal combustion engine in accordance with the tenth embodiment includes an internal combustion engine 1F capable of executing fuel combustion at lean air-fuel ratios, a lean NOx catalyst 2F located at a position of an exhaust conduit of the engine where the temperature of the lean NOx catalyst 3F rises to the temperature ($T_0$ of FIG. 39) which enables the catalyst to show a highest NOx reduction rate under a normal engine operating condition, cooling means for cooling the catalyst (for example, secondary air inlet means 3F), catalyst temperature detecting means 4F for detecting the temperature of the lean NOx catalyst 2F, and means for repeatedly producing a catalyst temperature rising condition. More particularly, the means for repeatedly producing a catalyst temperature rising condition includes means 6F which cools the catalyst 2F by operating the cooling means 3F when the catalyst temperature rises above $T_2$ and stops the cooling when the catalyst temperature falls below $T_3$ ($T_1$ is smaller than $T_3$, and $T_3$ is equal to or smaller than $T_0$). The cooling means may include a bypass conduit 8F bypassing the lean NOx catalyst 2F and a bypass valve 7F. When the exhaust gas flows through the bypass conduit 8F, the catalyst temperature falls.

The means 6F is constituted by an engine control computer which stores a program of FIG. 43, and a CPU of the computer executes calculations in accordance with the program.

In FIG. 43, the catalyst temperature TEX is read at step 101F. At the next step 102F, whether or not TEX is equal to or greater than $T_2$ of FIG. 39 is determined. When TEX is equal to or greater than $T_2$, the routine proceeds to a step 105F, where secondary air is supplied through the secondary air inlet 3F. Then, at step 106F, a secondary air supply flag F is set to "1". When TEX is lower than $T_2$ at step 102F, the routine proceeds to a step 103F, where whether or not flag F is "0" is determined, that is, whether the catalyst is in a temperature rising course or in a temperature falling course is determined. When flag F is "1" the catalyst is determined to be in the temperature falling course. The routine proceeds to a step 104F, and the cooling is continued until TEX reaches $T_3$. When TEX lowers below $T_3$, the routine proceeds to a step 107F, where supply of the secondary air is stopped, and at step 108F, flag F is set to "0". When flag F is determined to be "0" at step 103F, the catalyst is in a temperature rising course from engine start, and stopping of the supply of secondary air is continued to cause the catalyst to swiftly rise in temperature.

In accordance with the tenth embodiment, the temperature of the lean NOx catalyst is controlled to $T_0$ and a cycle of cooling and heating of the catalyst is repeatedly given to the lean NOx catalyst. As a result, the lean NOx purification rate of the lean NOx catalyst is greatly improved.

Although ten embodiments of the invention have been described in detail above, it will be appreciated by those skilled in the art that various modifications and alterations can be made to the particular embodiments shown with out materially departing from the novel teachings and advantages of the present invention. Accordingly, it is to be understood that all such modifications and alterations are included within the spirit and scope of the present invention as defined by the following claims.

What is claimed is:

1. A system for purifying exhaust gas from an internal combustion engine capable of executing fuel combustion at lean air-fuel ratios comprising:
   a nitrogen oxide reducing catalyst installed in an exhaust conduit of the engine and constructed of zeolite carrying at least one kind of metal selected from transition metals and noble metals, wherein the catalyst produces active species through partial oxidation of the hydrocarbons in an oxidizing gas condition and causes the active species to react with nitrogen oxides included in the exhaust gas to reduce the nitrogen oxides, wherein said catalyst reduces nitrogen oxides more strongly in a catalyst temperature rising condition than in other catalyst temperature conditions; and
   means for systematically producing a catalyst temperature rising condition while the engine is running by repeatedly executing a cycle of cooling the catalyst and then stopping the cooling to allow the catalyst to rise in temperature.

2. The exhaust gas purification system according to claim 1, and further comprising;
   a bypass conduit connected to the exhaust conduit so as to bypass the catalyst;
   a bypass valve adapted to switch exhaust gas flow between the catalyst and the bypass conduit;
   engine operating condition detecting means for detecting an operating condition of the engine; and
   catalyst temperature detecting means for detecting the temperature of the catalyst, and wherein the means for repeatedly producing a catalyst temperature rising condition includes bypass control means which switches on the bypass valve to cause the exhaust gas to flow through the bypass conduit when exhaust of nitrogen oxides from the engine is small and the catalyst temperature is equal to or higher then a first predetermined temperature and switches off the bypass valve to cause the exhaust gas to flow through the catalyst when the catalyst temperature is equal to or lower than a second predetermined temperature lower than the first predetermined temperature.

3. The exhaust gas purification system according to claim 1, and further comprising:
   a bypass conduit connected to the exhaust conduit so as to bypass the catalyst;
   a bypass valve adapted to switch flow of the exhaust gas between the catalyst and the bypass conduit;
   engine operating condition detecting means for detecting an operating condition of the engine; and
   catalyst temperature detecting means for detecting the temperature of the catalyst, and wherein the means for repeatedly producing a catalyst temperature rising condition includes bypass control means which switches on the bypass valve to cause the exhaust gas to flow through the bypass conduit when the engine operating condition is a condition where purification of nitrogen oxides can not be expected and the catalyst temperature is equal to or higher than a first predetermined temperature and switches off the bypass valve to cause the exhaust gas to flow through the catalyst when the catalyst temperature is equal to or lower than a second predetermined temperature lower than the first predetermined temperature.

4. The exhaust gas purification system according to claim 1, and further comprising:
   a bypass conduit connected to the exhaust conduit so as to bypass the catalyst;
   a bypass valve adapted to switch flow of the exhaust gas between the catalyst and the bypass conduit;
   engine operating condition detecting means for detecting an operating condition of the engine; and
   catalyst temperature detecting means for detecting the temperature of the catalyst, and wherein the means for repeatedly producing a catalyst temperature rising condition includes bypass control means which repeats switching on and switching off of the bypass valve at predetermined intervals in a temperature range above a predetermined catalyst temperature.

5. The exhaust gas purification system according to any one of claims 2 and 3, wherein the first predetermined temperature is 450° C. and the second predetermined temperature is 300° C.

6. The exhaust gas purification system according to claim 4, wherein the predetermined temperature is 300° C.

7. The exhaust gas purification system according to any one of claims 2, 3 and 4, and further comprising a three-way catalyst installed in a portion of the exhaust conduit downstream of the nitrogen oxides reducing catalyst.

8. The exhaust gas purification system according to claim 1, wherein the catalyst is constructed in the form of pellets, and further comprising:
   a catalytic converter case for housing catalyst pellets therein;
   a cooling chamber communicating with the catalytic converter case;
   circulating means for circulating the catalyst pellets between the converter case and the cooling chamber; and
   circulating velocity control means for controlling the velocity of the catalyst pellet circulation, the means for repeatedly producing a catalyst temperature rising condition including the cooling chamber and the circulating means.

9. The exhaust gas purification system according to claim 8, wherein the circulating means includes a rotational screw driven by a motor.

10. The exhaust gas purification system according to claim 9, wherein the circulating velocity control means includes a variable resistance installed in an electrical circuit connecting the motor and a power source.

11. A system for purifying exhaust gas according to claim 1, further comprising:
   engine operating condition detecting means for detecting an operating condition of the engine;
   engine operating condition determining means for determining whether or not the detected engine operating condition is in a deceleration or idling condition, such that the amount of nitrogen oxides included in exhaust gas from the engine is small relative to the amount of nitrogen oxides included in exhaust gas when the engine operating condition is not in a deceleration or idling condition; and
   secondary air supply means for introducing secondary air into a portion of the exhaust conduit upstream of the catalyst,
   and, wherein the means for repeatedly producing a catalyst temperature rising condition includes means which operate the secondary air supply means to introduce secondary air into the engine exhaust conduit when the engine operating condition is determined to be in a decelerating or idling condition by the engine operating condition determining means.

12. A system for purifying exhaust gas according to claim 11, wherein the engine operating condition detecting means includes a throttle sensor for detecting a throttle valve opening degree.

13. The exhaust gas purification system according to claim 1, and further comprising:
   a plurality of catalytic converter cases, the catalyst being divided into a plurality of portions and a portion of the catalyst being housed in each catalytic converter case;
   a plurality of branch conduits each connected to a corresponding catalytic converter case;
   a switching valve installed at a connecting portion of the branch conduits where all the branch conduits join each other so as to selectively direct the exhaust gas flow to any one of the branch conduits;
   a plurality of secondary air inlets each provided in a portion of each branch conduit upstream of the catalytic converter case;
   and wherein the means for repeatedly producing a catalyst temperature rising condition includes means which alternately switches the switching valve between the plurality of branch conduits when the exhaust gas temperature is high.

14. The exhaust gas purification system according to claim 1, and further comprising:
   a single catalytic converter case, the catalyst being installed in an intermediate portion of an internal space of the catalytic converter case;
   a dividing wall dividing a portion of the catalytic converter case internal space upstream of the catalyst into a plurality of sections so that the sections are in parallel with each other;
   a plurality of secondary air inlets each provided for each section of the upstream portion of the catalytic converter case internal space,
   and wherein the means for repeatedly producing a catalyst temperature rising condition includes means which alternately introduces secondary air through the secondary air inlet when the exhaust gas temperature is high.

15. The exhaust gas purification system according to any one of claims 13 and 14, and further comprising a three-way catalyst provided downstream of the nitrogen, oxides reducing catalyst.

16. The exhaust gas purification system according to claim 1, wherein the catalyst is divided into a first portion and a second portion arranged downstream of the first portion of the catalyst, and further comprising:
   a bypass conduit bypassing the first portion of the catalyst;
   a bypass valve adapted to switch flow of the exhaust gas between the first portion of the catalyst and the bypass conduit,
   and wherein the means for repeatedly producing a catalyst temperature rising condition includes means which alternately switches the bypass valve between the first portion of the catalyst and the bypass conduit when the exhaust gas temperature exceeds a predetermined temperature.

17. The exhaust gas purification system according to claim 16, wherein the predetermined temperature is 700° C.

18. The exhaust gas purification system according to claim 16, and further comprising a first three-way catalyst provided downstream of the first portion of the nitrogen oxides reducing catalyst and a second three-way catalyst provided downstream of the second portion of the nitrogen oxides reducing catalyst.

19. The exhaust gas purification system according to claim 1, wherein the catalyst is located at a position of the exhaust conduit where the catalyst temperature tends to rise above a temperature range between temperature $T_1$ and temperature $T_2$ at which the catalyst can show high NOx purification rates under a normal engine operating condition, and further comprising:
   cooling means for cooling the catalyst;
   catalyst temperature detecting means for detecting the temperature of the catalyst,
   and wherein the means for repeatedly producing a catalyst temperature rising condition includes means which begins cooling of the catalyst by operating the cooling means when the catalyst temperature detected by the catalyst temperature detecting means rises above the temperature $T_2$ and stops the cooling when the catalyst temperature detected by the catalyst temperature detecting means lowers below the temperature $T_1$.

20. The exhaust gas purification system according to claim 1, wherein the catalyst is located at a position of the exhaust gas conduit where the catalyst temperature tends to rise to a temperature at which the catalyst can show a highest NOx purification rate under a normal engine operating condition, and further comprising:
   cooling means for cooling the catalyst;
   catalyst temperature detecting means for detecting the temperature of the catalyst;
   and wherein the means for repeatedly producing a catalyst temperature rising condition includes means which begins cooling of the catalyst by operating the cooling means when the catalyst temperature detected by the catalyst temperature detecting means rises above the temperature $T_0$ and stops the cooling when the catalyst temperature detected by the catalyst temperature detecting means is lowered to a temperature equal to or lower than the temperature $T_0$.

21. The exhaust gas purification system according to any one of claims 19 and 20, wherein the cooling means includes secondary air supply means.

22. The exhaust gas purification system according to any one of claims 19 and 20, wherein the cooling means includes a bypass conduit bypassing the catalyst and a bypass valve for switching the exhaust gas flow between the catalyst and the bypass conduit.

* * * * *

UNITED STATES PATENT AND TRADEMARK OFFICE
CERTIFICATE OF CORRECTION

PATENT NO. : 5,331,809
DATED : July 26, 1994
INVENTOR(S) : Sinichi TAKESHIMA, et al.

It is certified that error appears in the above-indentified patent and that said Letters Patent is hereby corrected as shown below:

Column 6, line 54, after "300° C." delete --, is determined.--.

Column 8, line 32, change "valve" to --value--.

Column 9, lines 27 and 28, change "catalyst temperature rising condition repeatedly producing means." to --means for repeatedly reproducing a catalyst temperature rising condition.--

Column 9, line 37, change "! 2A" to --12A--.

Column 11, line 3, change "As s result," to --As a result,--.

Column 12, line 17, change ""O" that is" to --"O," that is,--.

Column 13, line 18, change "returns Because" to --returns.  Because--.

Column 13, line 24, change "11B" to --111B--.

Column 14, line 30, change "I" to --1--.

UNITED STATES PATENT AND TRADEMARK OFFICE
CERTIFICATE OF CORRECTION

PATENT NO. : 5,331,809
DATED : July 26, 1994
INVENTOR(S) : Sinichi TAKESHIMA, et al.

It is certified that error appears in the above-indentified patent and that said Letters Patent is hereby corrected as shown below:

Column 14, line 43, change "need." to --needed.--.

Column 15, line 33, change "tA) The" to --tA. The--.

Column 16, line 18, between "temperature" and "high" insert --is--.

Column 16, lines 63 and 64, change "catalyst temperature rising condition repeatedly reproducing means." to --means for repeatedly reproducing a catalyst temperature rising condition.--

Column 18, line 13, after "C." insert a comma and change "determined When" to --determined. When--.

Column 19, line 17, change "has no longer" to --no longer has--.

Column 19, line 56, change "mean" to --means--.

Column 20, line 6, change "T1" to --$T_1$--.

Column 20, line 41, change "T3" to --$T_3$--.

UNITED STATES PATENT AND TRADEMARK OFFICE
CERTIFICATE OF CORRECTION

PATENT NO. : 5,331,809
DATED : July 26, 1994
INVENTOR(S) : Sinichi TAKESHIMA, et al.

It is certified that error appears in the above-indentified patent and that said Letters Patent is hereby corrected as shown below:

Column 21, line 14, change "with out" to --without--.

Column 23, line 66, delete the comma after "gen".

Column 24, line 37, change "$T_2$and" to --$T_2$ and--.

Column 24, line 40, change "lowers" to --falls--.

Column 24, line 55, change "$T_0$and" to --$T_0$ and--.

Signed and Sealed this

Fourteenth Day of February, 1995

Attest:

BRUCE LEHMAN

*Attesting Officer*  *Commissioner of Patents and Trademarks*